(12) United States Patent
Kim et al.

(10) Patent No.: US 10,643,035 B2
(45) Date of Patent: *May 5, 2020

(54) TOOL FOR FACILITATING THE DEVELOPMENT OF NEW LANGUAGE UNDERSTANDING SCENARIOS

(71) Applicant: Microsoft Technology Licensing, LLC, Redmond, WA (US)

(72) Inventors: Young-Bum Kim, Bellevue, WA (US);
Ruhi Sarikaya, Redmond, WA (US);
Alexandre Rochette, Montreal (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/451,994

(22) Filed: Jun. 25, 2019

(65) Prior Publication Data
US 2019/0318000 A1    Oct. 17, 2019

Related U.S. Application Data

(63) Continuation of application No. 15/004,901, filed on Jan. 23, 2016.

(51) Int. Cl.
*G06F 40/40* (2020.01)
*G06F 40/35* (2020.01)

(52) U.S. Cl.
CPC .............. *G06F 40/40* (2020.01); *G06F 40/35* (2020.01)

(58) Field of Classification Search
USPC ........................................................ 704/7–10
See application file for complete search history.

(56) References Cited

U.S. PATENT DOCUMENTS

| | | | | |
|---|---|---|---|---|
| 2003/0212543 | A1* | 11/2003 | Epstein ................. | G06F 17/271 704/9 |
| 2015/0301795 | A1* | 10/2015 | Lebrun ................. | G06F 17/279 704/9 |
| 2015/0379430 | A1* | 12/2015 | Dirac .................... | G06N 20/00 706/12 |

* cited by examiner

*Primary Examiner* — Leonard Saint Cyr
(74) *Attorney, Agent, or Firm* — Rainier Patents, P.S.

(57) ABSTRACT

A computer-implemented technique is described for facilitating the creation of a language understanding (LU) component for use with an application. The technique allows a developer to select a subset of parameters from a larger set of parameters. The subset of parameters pertains to a LU scenario to be handled by the application. The larger set of parameters pertains to a plurality of LU scenarios handled by an already-existing generic LU model. The technique creates a constrained LU component that is based on the subset of parameters in conjunction with the generic LU model. At runtime, the constrained LU component interprets input language items using the generic LU model in a manner that is constrained by the subset of parameters that have been selected, to provide an output result. The technique also allows the developer to create new rules and/or supplemental models.

20 Claims, 16 Drawing Sheets

WORD₁ → TAG₅, T̶A̶G̶₆̶, T̶A̶G̶₉̶, TAG₂₀, ···    WORD₁ → TAG₅

WORD₂ → T̶A̶G̶₇̶, TAG₈₅, T̶A̶G̶₉̶, TAG₅,  ⇒     WORD₂ → TAG₈₅

WORD₃ → T̶A̶G̶₄₅̶, TAG₈, T̶A̶G̶₃₄̶, TAG₂₀, ···   WORD₃ → TAG₈

⋮                                              ⋮

TOOL FOR FACILITATING THE DEVELOPMENT OF NEW LANGUAGE UNDERSTANDING SCENARIOS

BACKGROUND

A developer faces daunting challenges in adding natural language understanding (LU) functionality to an application. LU functionality is typically complex technology from both theoretical and practical standpoints. A developer may lack the required mastery of such technology to build the LU functionality. And even when the developer does possess the necessary knowhow to build the LU functionality, the process of building the LU functionality can be time-consuming, resource-intensive and expensive.

SUMMARY

A computer-implemented technique is described herein for facilitating the creation of a natural language understanding (LU) component for use with an application. In one implementation, the technique allows a developer to select a subset of parameters (e.g., intents, slots, etc.) from a larger set of parameters. The subset of parameters defines a schema that pertains to the LU scenario to be handled by the application. In contrast, the larger set of parameters pertains to a plurality of LU scenarios handled by an already-existing generic LU model, associated with different respective domains of analysis. The technique provides a constrained LU component that is based on the subset of parameters in conjunction with the generic LU model. At runtime, the constrained LU component receives an input language item, e.g., an utterance or text input, from an end user. The constrained LU component interprets the input language item using the generic LU model in a manner that is constrained by the subset of parameters that has been selected, to provide an output result.

In one manner of operation, the constrained LU component restricts the generic LU model by filtering an output result of the generic LU model based on the selected subset of parameters. In another manner of operation, the constrained LU component constrains the manner in which the generic LU model interprets the input linguistic item, e.g., by restricting the transitions of a decoding lattice used by the generic LU model based on the selected subset of parameters.

According to another illustrative aspect, the technique allows the developer to author new rules and/or create supplemental statistical models. The developer may choose to create new rules and/or models when the preexisting generic LU model cannot meet all of the requirements of the new language understanding scenario.

By virtue of the fact that the technique reuses and repurposes existing LU resources, the technique allows the developer to quickly and efficiently build an LU component, even when the developer is relatively inexperienced with respect to natural language understanding technology.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
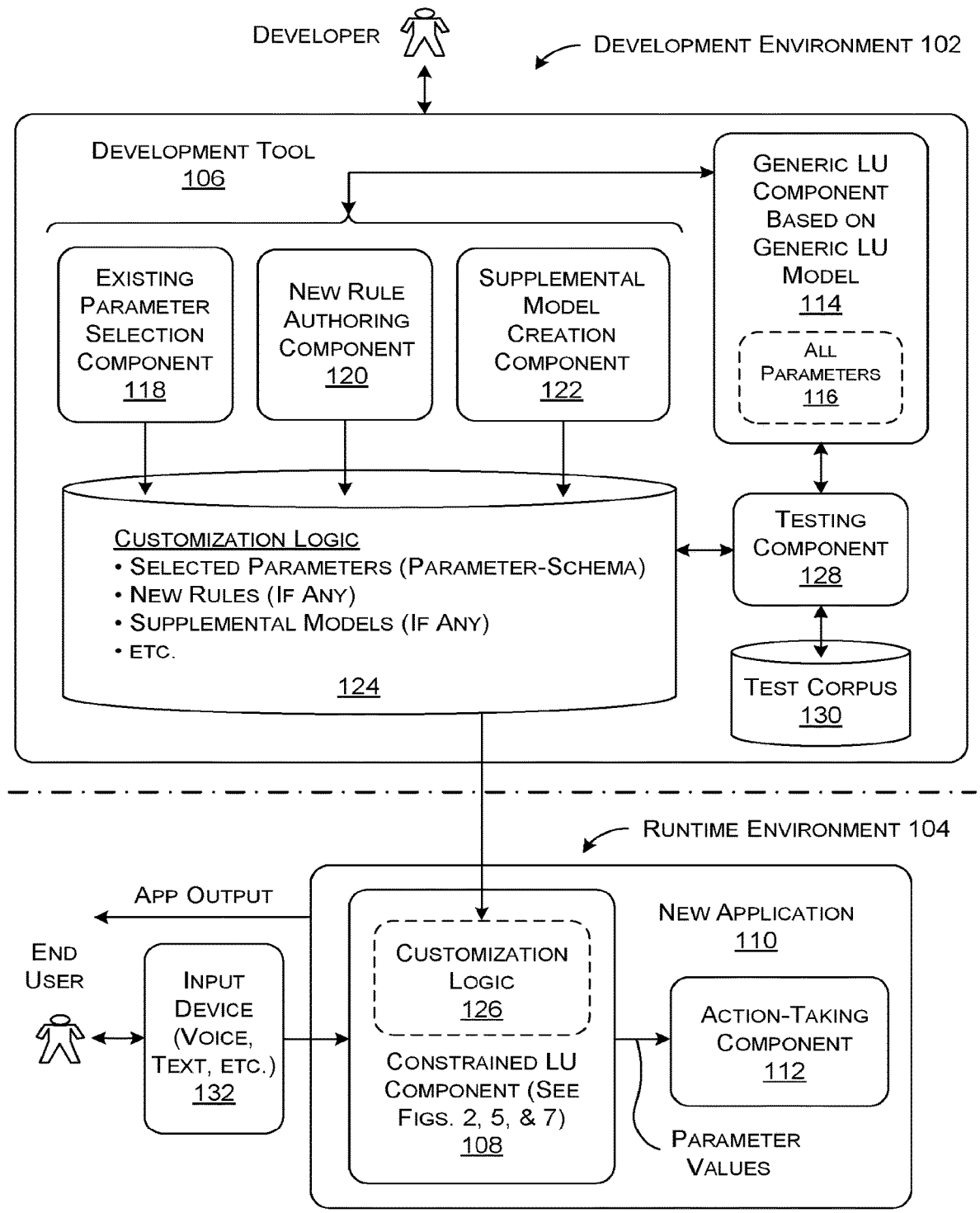
FIG. 1 shows an overview of a development environment for creating a constrained language understanding (LU) component, and a runtime environment for executing the constrained LU component.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes computer-implemented systems for creating and applying a constrained language understanding (LU) component. Section B sets forth illustrative methods which explain the operation of the systems of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or hardware (e.g., chip-implemented logic functionality), etc., or any combination thereof.

As to terminology, the phrase "configured to" encompasses various physical and tangible mechanisms for performing an identified operation. The mechanisms can be configured to perform an operation using, for instance, software running on computer equipment, hardware (e.g., chip-implemented logic functionality), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview

FIG. 1 shows an overview of a development environment 102 and a runtime environment 104. With respect to the development environment 102, a developer interacts with a development tool 106 to create a constrained language understanding (LU) component 108. (As used herein, the term "developer" refers to any person or group of people who interact with the development tool 106 in any context, rather than a specific type of person.) The constrained LU component 108 operates as a natural language interface for an application 110 under development. Or the constrained LU component 108 operates as a natural language interface to an existing application 110 that is being "retrofitted" with LU capability. The term application, as used herein, is intended to broadly encompass any functionality that performs any task(s); an application may correspond to a user application, operating system functionality, a service, etc.

With respect to the runtime environment 104, the constrained LU component 108 receives an input linguistic item (e.g., an utterance, text input, etc.) from an end user. The constrained LU component 108 interprets the input linguistic item to provide parameter values. The constrained LU component 108 then passes the parameter values to an action-taking component 112. The action-taking component 112 performs an application-specific function on the basis of the parameter values.

The constrained LU component 108 is configured to handle a natural language scenario that complements the function(s) performed by an application 110. For example, assume that the application 110 allows the end user to perform various actions regarding a database of movies. For instance, the application 110 may allow a user to search for movies that match his or her interests. The application 110 may also allow a user to purchase a movie. In connection therewith, the constrained LU component 108 can be expected to handle queries and commands that pertain to various attributes of movies, such as movie titles, movie actors and actresses, movie directors, movie genres, movie show times, movie run lengths, movie ratings, and so on. The constrained LU component 108 can also be expected to understand various user intents pertaining to movies. For example, the constrained LU component 108 can be expected to understand when the user intends to find information regarding a movie, when the user intends to purchase a movie, and so on. Collectively, the scope and nature of the linguistic items that the application 110 is expected to receive from end users define the natural language scenario associated with the application 110.

This subsection provides an overview of the development environment 102 and the runtime environment 104. Subsection A.2 provides additional details regarding the runtime environment 104. Subsection A.3 provides additional details regarding the development environment 102.

With respect to the development environment 102, the development tool 106 develops the constrained LU component 108 by leveraging a preexisting generic LU component 114. The generic LU component 114 operates based on a generic LU model. The generic LU model is qualified as being "generic" or general-purpose because it is configured to handle several different LU scenarios, associated with respective domains of analysis. For example, without limitation, the generic LU model may be configured interpret an end user's request to find a restaurant location, find a route from one location to another, set up a reminder in a calendar, set up an alarm, and so on. These functions are associated with different respective LU scenarios.

A training system (not shown) produces the generic LU model based on any statistical machine-learning technique. For example, without limitation, the training system can use a deep neural network technique to produce a deep neural network model that is designed to determine the intent of an input linguistic item. The training system can use a Conditional Random Field (CRF) technique to produce a tagging model that is designed to interpret each word in the input linguistic item, with respect to a set of given possible tags. In this non-limiting implementation, the neural network model and the CRF tagging model collectively constitute the generic LU model. The generic LU model itself is made up of a set of model values produced in the machine-learning process(es).

More specifically, the training system operates on a corpus of annotated training examples to produce the generic LU model. Because the generic LU model is designed to span multiple scenarios, the training examples capture linguistic items appropriate to those different scenarios. For instance, the training examples can include instances of end users attempting to set up calendar appointments and instances of end users asking for directions from one location to the next, and so on. A training example is annotated in the sense that the example as a whole is tagged with a descriptive label (describing its intent), and the words in the example are tagged with respective descriptive labels (describing their respective meanings).

FIG. 1 shows that the generic LU model encompasses a master set of parameters 116. Generally, parameters may take the form of at least intents and slots. An intent refers to the overall intent of an end user in submitting a linguistic item. For example, consider the input linguistic item, "Schedule a meeting with Bob at December 10$^{th}$, 2 PM to talk about the product release." The intent of this item corresponds to the end user's desire to set up a calendar appointment. A slot refers to the attributes of a linguistic item that characterize its meaning. For example, the above-noted linguistic item can be characterized using slots for meeting date, meeting time, meeting participants, and meeting subject. More specifically, as used herein, the term "parameter" refers to a parameter type or variable, such as the parameter type of meeting time. A linguistic item is characterized by one or more parameter types together with associated parameters values. For example, the above-noted linguistic item includes the parameter type-value pairs corresponding to: <meeting date=Dec. 10, 2015>, <meeting time=2 PM>, <meeting participants=Bob>, and <meeting subject=product release>.

The master set of parameters 116 encompasses the parameters associated with the multiple LU scenarios handled by the generic LU model. For example, the master set of parameters 116 can include parameters that are designed to handle the end users' requests to find restaurant locations, parameters that are designed to handle the end users' requests to find routes from one location to another, parameters that are designed to handle the end users' requests to set up reminders in a calendar, and so on. In one implementation, the master set of parameters 116 can include, in aggregate, several hundred of such parameters.

Note, however, that while the generic LU model is configured to handle multiple scenarios, it cannot possibly encompass every scenario contemplated by a future application developer. As such, the generic LU model (together with the master set of parameters 116) can be considered "generic" only in the sense that it encompasses plural scenarios.

As a general principle, the development tool 106 generates the constrained LU component 108 by constraining the generic LU model to handle the LU scenario associated with the application 110 under development. The development tool 106 constrains the generic LU component 114, in turn, by principally invoking some parts of the generic LU model, but not other parts of the generic LU model. In other words, the development tool 106 selectively reuses some of the existing resources associated with the generic LU model, but not other resources.

In greater detail, a parameter selection component 118 receives input information from the developer which specifies a subset of parameters. The developer selects the subset of parameters by choosing from among the larger set of parameters 116 associated with the generic LU model. The subset of parameters characterizes the LU scenario to be handled by the application 110. In other words, the subset of parameters can be said to define the parameter-schema of the application 110. For example, in the above-described movie database context, the subset of parameters may include an intent parameter that expresses the end users' desire to find information in the movie database. Another intent parameter can express the end users' intent to purchase a movie, etc. The subset of parameters might also include slot parameters that characterize queries and commands pertaining to the movie database. The slot parameters might include, for instance, a movie title parameter, a movie actor/actress parameter, a movie director parameter, a movie show time parameter, and so on.

The developer may reuse existing parameters from the existing master set of parameters 116 in different ways. In a first case, assume that the generic LU model includes a set of parameters that directly map to the LU scenario being handled by the new application 110. For example, assume that the generic LU model already includes slot parameters that describe different attributes of movies, together with intent parameters that describe different actions performed by end users with respect to the movies. In this situation, the developer can pick out these parameters for use with the application 110 from the master set of parameters 116.

In a second case, assume that the generic LU model does not include parameters that directly map to the LU scenario being handled by the new application 110. Nevertheless, assume that the generic LU model includes parameters associated with at least one function that is related to the application 110 being developed. For example, assume that the developer is attempting to create a travel-related application that handles various user requests pertaining to travel, such as an end user's request to provide information regarding a particular place (as in the request, "show me Hawaii"), and an end user's request to book a flight to a particular place (as in the request, "book a flight from Seattle to Hawaii"). The generic LU model may not have intent parameters that are narrowly directed to these travel-related intents. But the generic LU model may nevertheless support related intent parameters, such as an intent parameter which reflects an end user's request to find a particular place (as in the request "show me Seattle"), and an end user's request to get directions from one location to another (as in "find a route from Seattle to Bellevue"). The developer may reuse the available "find place" and "get route" intent parameters in the travel-related context.

Similarly, assume that the master set of parameters 116 includes a "beginning location" slot parameter and a "destination location" slot parameter that were initially created for the purpose of interpreting an end user's request to find a driving or walking route from a specified source location to a specified destination location (as in the request, "find a route from Seattle to Bellevue"). The developer may use these slot parameters in the travel-related context to book flights from a source location to a destination location (as in the request, "book a flight from Seattle to Hawaii").

In a third case, assume that the developer is creating a LU scenario for an application that handles complex tasks that combine two or more elementary functions. For example, the developer may wish to create an LU scenario that can successfully interpret an end user's request to find the nearest auto rental agency and then book a car at that agency. Assume that the generic LU model encompasses a first set of parameters directed to a "find place" task (or an analogous function), and a second set of parameters directed to a "reserve an automobile" task (or an analogous function). The developer can pick the parameters from both the first and second sets of parameters, even though the generic LU model was not initially developed based on the expectation that the "find place" function would ever be combined with the "reserve an automobile" function.

In a fourth case, the developer may be successful in finding parameters to handle some aspects of the LU scenario being developed, but not other aspects of the LU scenario. To address this situation, the developer may choose the parameters that are relevant to the LU scenario being developed. The developer may then create one or more new rules and/or one or more supplemental statistical models. The new rules and/or supplemental statistical models handle the aspects of the new LU scenario that are not satisfied through the reuse of the existing generic LU model. In these cases, the development tool 106 produces a constrained LU component 108 that integrates some reused resources (taken from the generic LU model) with one or more new rules and/or one or more supplemental models To address the above situation, the development tool 106 provides a new rule authoring component 120 and a supplemental model creation component 122. The new rule authoring component 120 provides functionality that enables a developer to create one or more new rules. The supplemental model creation component 122 provides functionality that enables a developer to create one or more supplemental statistical models of any type.

A data store 124 stores the output results provided by the parameter selection component 118, the new rule authoring component 120 (if invoked), and the supplemental model creation component 122 (if invoked). For example, the data store 124 can store the subset of parameters selected using the parameter selection component 118, the rule(s) (if any) created using the new rule authoring component 120, and/or the supplemental statistical model parameters (if any) created by the supplemental model creation component 122.

Collectively, all of the above-summarized data provided in the data store 124 can be regarded as customization logic 126. The development tool 106 combines the customization logic 126 with the generic LU component 114 (in the manner to be described below in Subsection A.2) to create the constrained LU component 108. In other words, the development tool 106 applies the customization logic 126 to restrict the operation of the generic LU component 114, to thereby produce the constrained LU component 108.

An optional testing component 128 can be invoked by the developer to investigate the performance of the constrained LU component 108 that has been created, or parts thereof. For example, assume that the developer has added a new rule to the data store 124. The testing component 128 can process a set of test examples (in a data store 130) using the new rule to provide output results. The developer can examine the output results to determine whether the new rule appears to be operating in a desired manner. For example, the new rule may be intended to apply to some test examples, but not other test examples, depending on the linguistic content of the test examples. The developer may conclude that a new rule is providing unsatisfactory output results when it applies to too many test examples in the test corpus.

In another case, the developer may use the testing component 128 to process the test examples using a new rule and/or a supplemental statistical model to produce first output results, and then process the same test examples using the generic LU component 114 to provide second output results. The developer may then use the testing component 128 to compare the first output results to the second output results. In some cases, the developer may find that the new rule and/or statistical model essentially duplicates an interpretation function already performed by the generic LU component 114. In those cases, the developer may decide to forgo the use of the new rule and/or statistical model. Moreover, the testing component 128 can suggest the existing parameter(s) that the developer may use to achieve the same performance as the new rule and/or statistical model.

Now referring to the runtime environment 104, an input device 132 receives an input linguistic item from the user and optionally performs preliminary processing on input linguistic item. For example, for speech input, the input device 132 can use any speech recognition technology to convert a voice signal (received by one or more microphones) to recognized words. The constrained LU component 108 receives the recognized input linguistic item from the input device 132. The constrained LU component 108 then determines the parameter values associated with the linguistic item, e.g., corresponding to one or more intent value, and/or one or more slot values. In doing so, the constrained LU component 108 applies the generic LU model as described above, but constrains the generic LU model on the basis of the customization logic 126. The next subsection will describe how this constraining operation may be performed in different implementations. Finally, an action-taking component 112 receives and acts on the parameter values fed to it by the constrained LU component 108.

For example, again assume that the application 110 handles queries regarding a movie database. The end user may input a question, "What is the opening date of the new Star Wars movie?" The constrained LU component 108 can identify the intent and slot values associated with this query, and then pass those values to the action-taking component 112. The action-taken component 112 can use the parameter values to query a movies database to determine an answer to the end user's query. The application 110 then passes the answer to the end user.

According to one technical advantage, the development tool 106 permits a developer to quickly and efficiently develop the constrained LU component 108. The development tool 106 achieves this efficiency by allowing the developer to declaratively carve out the features of the constrained LU component 108 from the generic LU component model, rather than requiring the developer to create the constrained LU component 108 from "scratch." As a further consequence, the development tool 106 can produce the constrained LU component at reduced expense (compared to the case in which the constrained LU component 108 is created from scratch). The development tool 106 also permits developers of varying skill and knowledge levels to create the constrained LU component 108, including developers who have relatively modest (or no) familiarity with LU technology.

A.2. Runtime Environment

Figure 2:
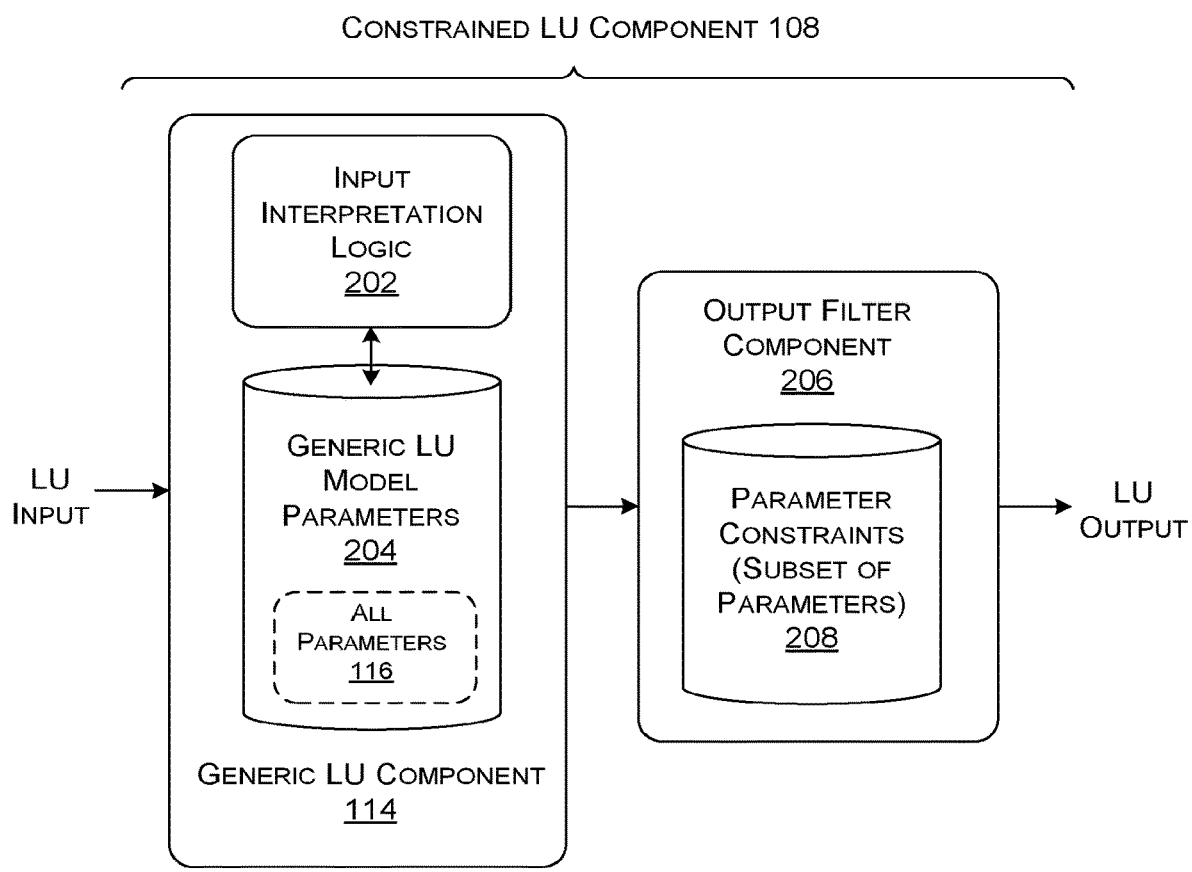
FIG. 2 shows one implementation of the constrained LU component of FIG. 1.

FIG. 2 shows a first implementation of the constrained LU component 108. In this implementation, the constrained LU component 108 incorporates the generic LU component 114. The generic LU component 114, in turn, includes input interpretation logic 202 for processing an input linguistic item (e.g., an utterance, input text, etc.) on the basis of the generic LU model, to provide an intermediary output result. The generic LU model corresponds to a set of model values provided in a data store 204, produced in a machine-training process. As described above, the generic LU model is designed to handle a plurality of LU scenarios associated with a master set of parameters 116.

An output filter component 206 includes a data store 208 which identifies the subset of parameters selected by the parameter selection component 118. The output filter component 206 operates by filtering the intermediary results provided by the generic LU component 114 on the basis of the subset of parameters in the data store 208, to provide a final output result.

Figure 3:
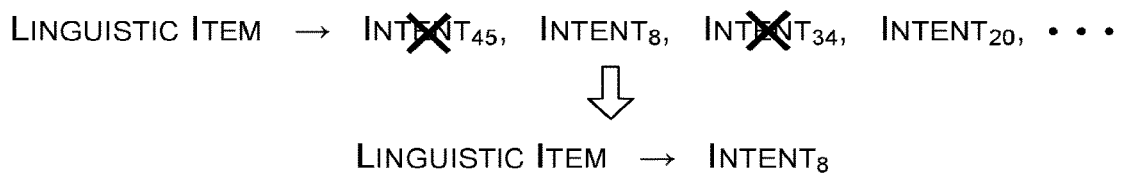
FIG. 3 shows an example of the operation of the constrained LU component of FIG. 2.

FIG. 3 shows an example of the type of constrained LU component 108 shown in FIG. 2. In this case, the generic LU component 114 assigns a set of n intent classifications to an input linguistic item as a whole. The n intent classifications have decreasing degrees of confidence associated therewith. For example, the generic LU component 114 can use a deep neural network model to determine a set of the n most likely intent classifications of the input linguistic item, with decreasing degrees of confidence. More specifically, in FIG. 3, the generic LU component 114 determines that the input linguistic item corresponds to $intent_{45}$, $intent_8$, $intent_{34}$, $intent_{20}$, and so on, with decreasing degrees of confidence. The output filter component 206 then eliminates any intent classification that is not in the subset of selected intent parameters. For example, the output filter component 206 eliminates $intent_{45}$, $intent_{34}$, etc. The constrained LU component 108 identifies $intent_8$ as the intent classification of the input linguistic item, because this intent classification has the highest likelihood among the surviving intent classifications.

Figures 4, 5:
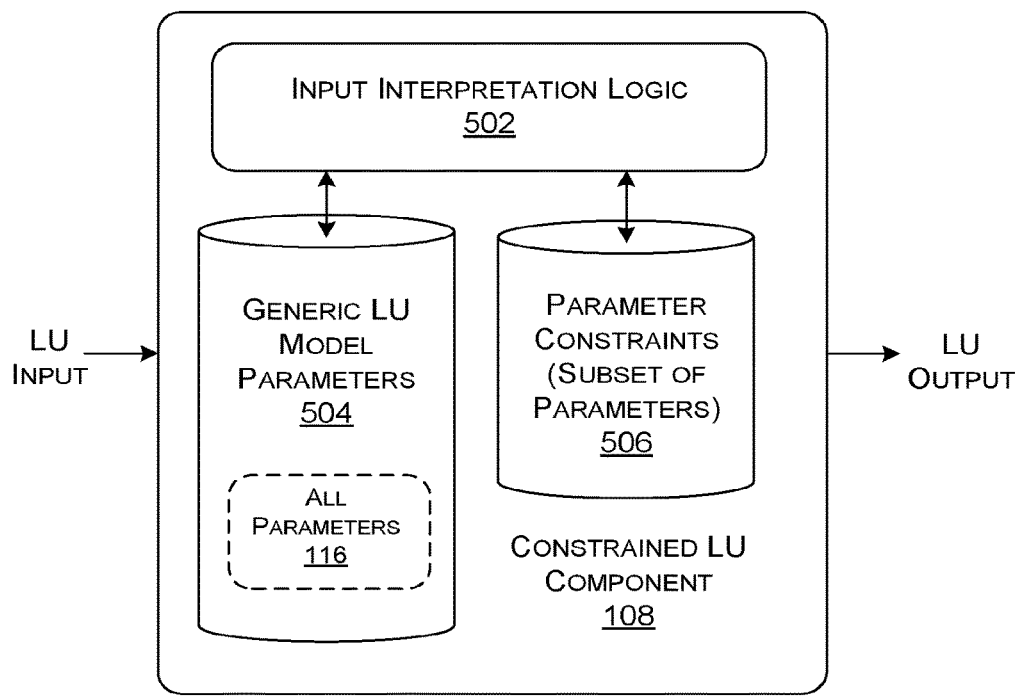
FIG. 4 shows another example of the operation of the constrained LU component of FIG. 2.
FIG. 5 shows another implementation of the constrained LU component of FIG. 1.

FIG. 4 shows another implementation of the type of constrained LU component 108 shown in FIG. 2. In this case, the constrained LU component 108 uses the generic LU component 114 to assign a set of n tags to each word in an input linguistic item, with increasing decreasing degrees of confidence. For example, the generic LU component 114 can use a CRF model to determine a set of the n most likely tags for each word in the linguistic item, with decreasing degrees of confidence. The tags correspond to possible slot parameters selected from the master set of parameters 116. For instance, the generic LU component 114 determines that the first word ($word_1$) in the input linguistic item corresponds to $tag_5$, $tag_6$, $tag_9$, $tag_{20}$, etc. with decreasing degrees of confidence. Like the example of FIG. 3, the output filter component 206 eliminates any intermediary output result that is not specified in the subset of parameters (in the data store 208). As a result, the constrained LU component 108 indicates that $word_1$ corresponds to $tag_5$ (because this is the surviving tag having the highest confidence after the filtering has been performed). The constrained LU component 108 determines that $word_2$ corresponds to $tag_{85}$, and $word_3$ corresponds to $tag_8$, and so on.

FIG. 5 shows another implementation of the constrained LU component 108. Here, the input interpretation logic 502 operates on the basis of the generic LU model provided in a data store 504. To repeat, the generic LU model is designed to handle a plurality of LU scenarios associated with a master set of parameters 116. The input interpretation logic 502 also operates on the basis of the subset of selected parameters provided in a data store 506.

In operation, the input interpretation logic 502 uses the constraints specified in the data store 506 to restrict the manner it interprets an input linguistic item. Thus, the input interpretation logic 502 changes the manner in which it processes the input linguistic item on the basis of the constraints in the data store 506. In contrast, in the example of FIG. 2, the input interpretation logic 202 delegates the constraining operation to the downstream output filter component 206, which operates on the intermediary output results provided by the generic LU component 114.

Although not shown, the implementation of FIG. 5 can also include the type of output filter component 206 shown in FIG. 2. In other words, while this subsection describes FIGS. 2 and 5 as separate implementations, the features of these two implementations can also be combined together.

Figure 6:
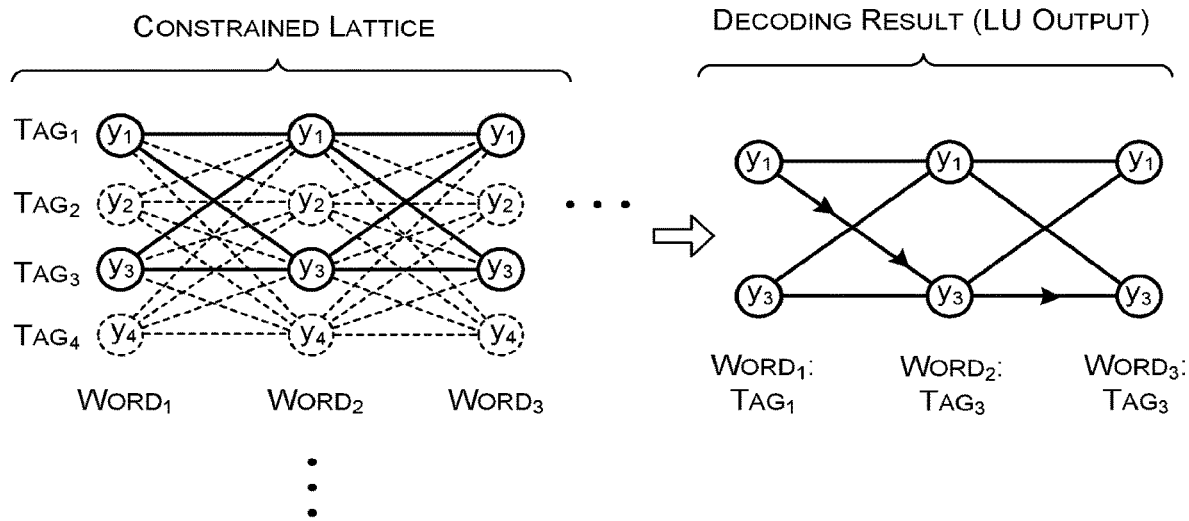
FIG. 6 shows an example of the operation of the constrained LU component of FIG. 5.

FIG. 6 shows an example of the operation of the constrained LU component of FIG. 5. In this case, the input interpretation logic 502 uses a decoding lattice to apply tags to the individual words in an input linguistic item. A first dimension of the lattice (e.g., the vertical dimension in FIG. 6) identifies a set of possible tags that can be applied to each word in the input linguistic item. The set of all possible tags corresponds to the master set of parameters 116. A second dimension of the lattice (e.g., the horizontal dimension in FIG. 6) corresponds to individual words (or other linguistic units) in the input linguistic item. Each node in the lattice therefore corresponds to a possibility of assigning a particular tag (parameter) to a particular word in the input linguistic item. Each transition from one node to another node in the lattice has a weight (or cost) determined by a machine-training process. The input interpretation logic 502 operates by using some kind of search algorithm (e.g., the Viterbi search algorithm or the like) to find the path having the lowest cost through the lattice. That optimal path through the lattice defines the assignment of tags (parameters) to individual words in the input linguistic item.

In the context of the constrained LU component 108, the input interpretation logic 502 eliminates all transitions to and from a node associated with a tag that is not included in the subset of selected parameters. For example, in the simplified example of FIG. 6, assume that $tag_1$ and $tag_3$ are included in the set of selected parameters, while $tag_2$ and $tag_4$ are not included in the set of selected parameters. The input interpretation logic 502 therefore deactivates any transition to or from $tag_2$ or $tag_4$. After modifying the decoding lattice in this manner, the input interpretation logic 502 uses the constrained lattice to interpret the input linguistic item. In the merely illustrative case of FIG. 6, the input interpretation logic 502 applies the constrained lattice to determine that $tag_1$ is assigned to $word_1$, and $tag_3$ is assigned to $word_2$ and $word_3$.

Figure 7:
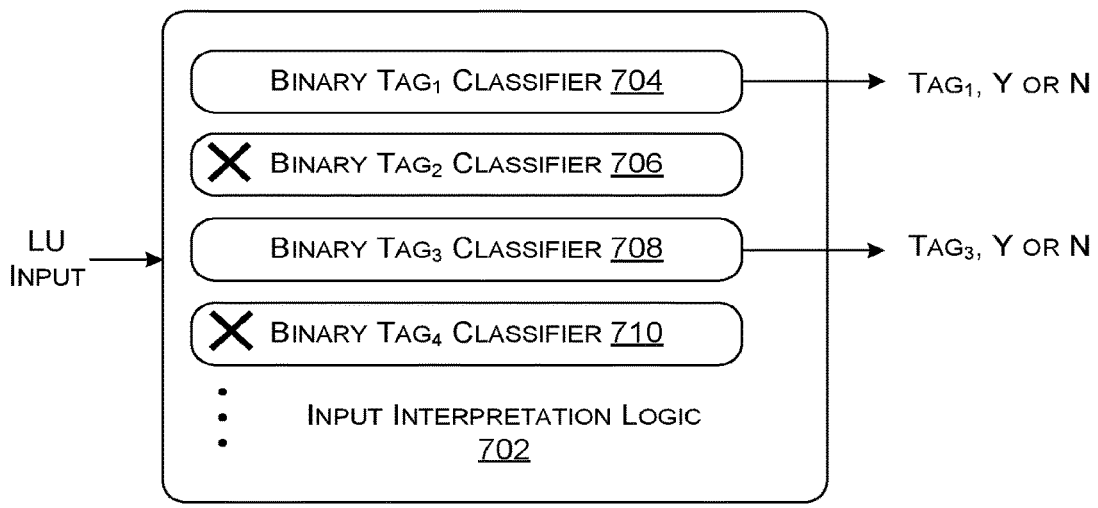
FIG. 7 shows another example of the operation of the constrained LU component of FIG. 5.

FIG. 7 shows another example of the operation of the constrained LU component 108 of FIG. 5. Here, the input interpretation logic 702 relies on a plurality of binary classifier components (704, 706, 708, 710, . . . ). In an intent classification context, each binary classifier component is configured to determine whether an input linguistic item (considered as a whole) corresponds to a particular intent. In a slot interpretation context, each binary classifier component is configured to determine whether a word (or other linguistic unit) in the linguistic item corresponds to a particular slot tag. For example, the first binary classifier component 704 can determine whether a word in the input linguistic item under consideration corresponds to $tag_1$ or not. The second binary classifier component 706 determines whether the same word in the input linguistic item corresponds to $tag_2$ or not, and so on. A training system (not shown) can produce binary classification models for the respective binary classifier components using any machine-training process.

When used in the context of the constrained LU component 108, the input interpretation logic 702 deactivates all binary classifier components for those parameters that are not included in the set of selected parameters. For example, in the merely illustrative case of FIG. 7, the input interpretation logic 702 deactivates the binary classifier component 706 for $tag_2$ and the binary classifier component 710 for $tag_4$. The input interpretation logic 702 can then select the output result provided by the remaining binary classifier components (704, 708, etc.) that has the highest likelihood value. For example, when processing an individual word in an input linguistic item, the binary classifier component 704 can determine whether that word corresponds to $tag_1$ or not, with a first likelihood value. The binary classifier component 708 can determine whether that same word corresponds to $tag_3$ or not, with a second likelihood value. The input interpretation logic 702 can select either the output result of the $tag_1$ classifier component 704 or the $tag_3$ classifier component 708, depending on which output result has the highest confidence value.

The implementations of this subsection are presented in the spirit of illustration, not limitation. Still other implementations can use other techniques to constrain the operation of the generic LU model based on the selected subset of parameters.

A.3. Development Environment

Figure 8:
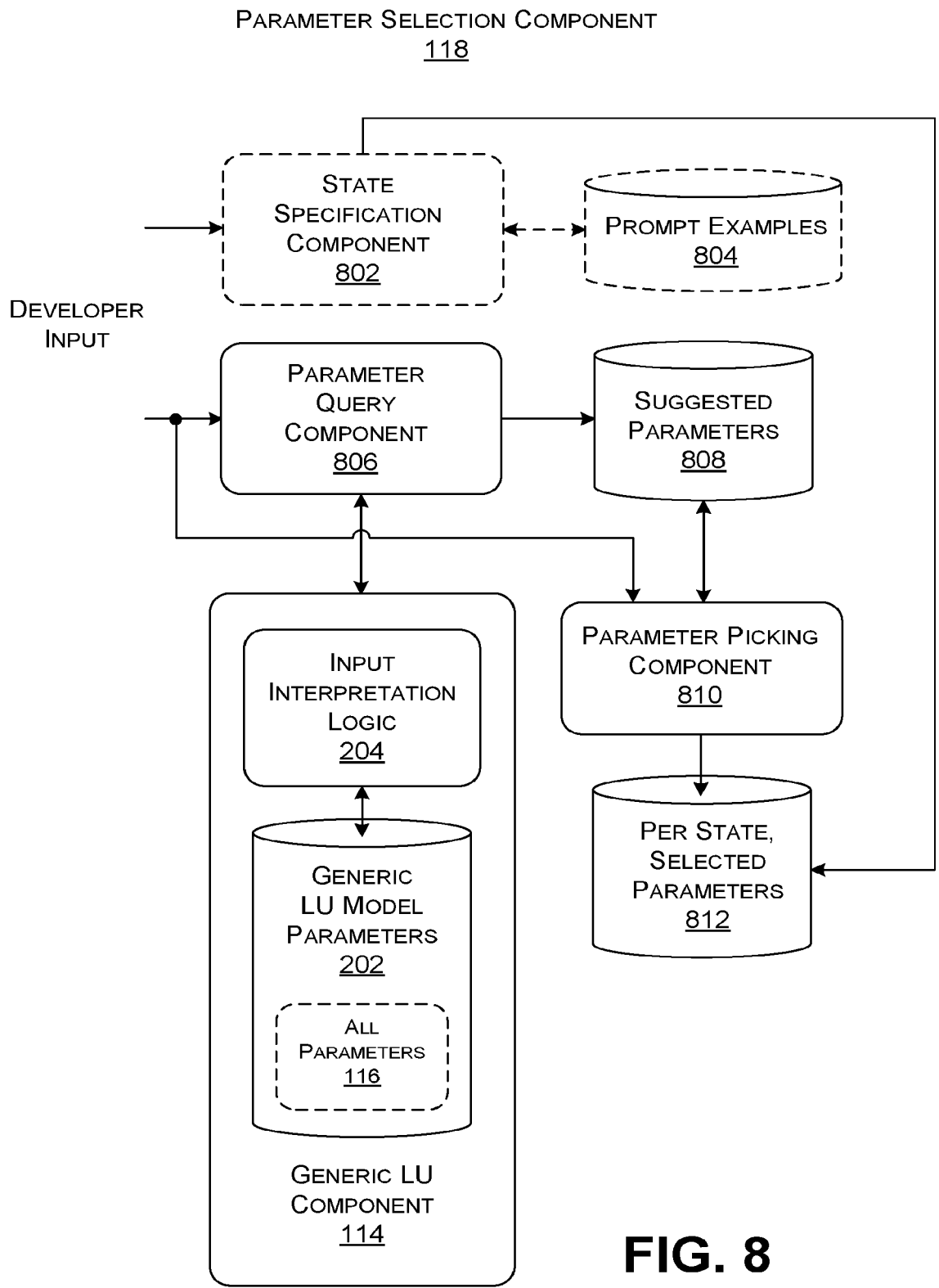
FIG. 8 shows one implementation of a parameter selection component of FIG. 1.

FIG. 8 shows one implementation of the parameter selection component 118 that was introduced in the discussion of FIG. 1. The parameter selection component 118 provides a mechanism by which a developer can select the subset of parameters from the full set of parameters 116 associated with the generic LU model.

First, note that the new LU scenario being developed may be characterized as either single-turn or multi-turn. A single-turn dialog corresponds to an exchange between the end user and the application 110 in which the end user enters a single linguistic item. The application 110 offers a response based on the single linguistic item. A multi-turn dialog corresponds to an exchange in which the end user may enter plural linguistic items over a span of time in the course of accomplishing a task. The application 110 may provide several responses, interleaved with the end user's linguistic items. A state in a multi-turn dialog refers to a particular juncture in the exchange between the end user and the application.

A developer may wish to select different sets of parameters for different respective states in a multi-turn dialog. The set of parameters for a particular state characterizes the nature of linguistic items that are expected at that state. To provide a simplified example, assume that, at a particular state in a multi-turn dialog, the application is expecting the end user to confirm a particular selection that has been made by the end user. For that state, the developer may select a first intent parameter corresponding to "confirmation," a second intent parameter corresponding to "rejection," and optionally a third intent parameter which indicates that the user does not understand what is expected of him or her at this juncture. In other words, those three intents define the universe of responses that are expected at this juncture of the dialog.

A state specification component 802 allows the developer to describe the state of a multi-turn dialog to which the selection of parameters will pertain, to thereby provide state information, e.g., either by specifying the exact state or selecting one or more characteristics associated with the state (without necessarily fully specifying the state). The developer can describe the state in different ways, as will be clarified below. In one approach, the developer can characterize the state by specifying a prompt that the application 110 might generate at this stage. For example, with respect to the above example in which the user is being asked to confirm a previous selection, the application might generate a prompt that reads, "Please confirm that x," where x is a placeholder referring to any information to be confirmed. The prompt serves as a shorthand reference to the state being targeted by the developer. A data store 804 stores a list of predetermined prompts from which the developer may choose.

The parameter selection component 118 also includes a query component 806 through which the developer may investigate the parameters that are available in the master set of parameters 116. The query component 806 can operate in different modes. In a first mode, the developer can request the query component 806 to show all of the parameters in the master set of parameters 116. In response, the query component 806 can present the master set of parameters 116 in a scrollable list or some other format. More specifically, the query component 806 can present a set of intent parameters in a first list and a set of slot parameters in a second list.

In a second mode, the developer can enter a keyword associated with the parameter (or parameters) being sought. In response, the query component 806 can present a set of parameters which match the keyword, selected from the master set of parameters 116. The query component 806 can perform matching on a lexical level, semantic level, etc., or combination thereof. For example, if the developer is interested in finding a parameter associated with the starting time of a movie, the developer might enter the keyword "time," or the key phrase "starting time," or "show time," etc. The query component 806 may then return all parameters that have the word "time" as part of their respective descriptive labels or textual definitions.

In a third mode, the developer can enter one or more example linguistic items into the query component 806. In response, the query component 806 can identify a set of candidate parameters from the master set of parameters 116 that are implicated by the example linguistic item(s). The query component 806 can achieve the above result by submitting the developer's example linguistic item(s) to the generic LU component 114. The input interpretation logic 202 can determine the most likely intent parameter(s) and slot parameter(s) for the example linguistic item(s) by processing the example linguistic item(s) using the generic LU model. The query component 806 can then return a list of all of the intent parameters and slot parameters that have been identified by the generic LU component 114.

A developer may leverage yet other modes to specify the subset of parameters. In a fourth mode, the query component 806 provides a subset of candidate intent parameters and slot parameters that are appropriate to a dialog state that the user has selected via the state specification component 802 (if any). In a fifth mode, the query component 806 first receives the developer's selection of one or more intent parameters; the query component 806 then provides a subset of candidate slot parameters that are appropriate to the intent parameter(s) selected by the developer.

A data store 808 stores the parameters identified by the query component 806. A parameter picking component 810 receives the developer's selection of one or more of the parameters in the data store 808. And a data store 812 stores the parameters chosen by the parameter picking component 810. The parameters in the data store 812 constitute the subset of parameters that are used to constrain the operation of the generic LU component 114 during runtime, with respect to the particular state described by the state specification component 802. The developer can repeat the above process for each state of a multi-state dialog.

Figure 9:
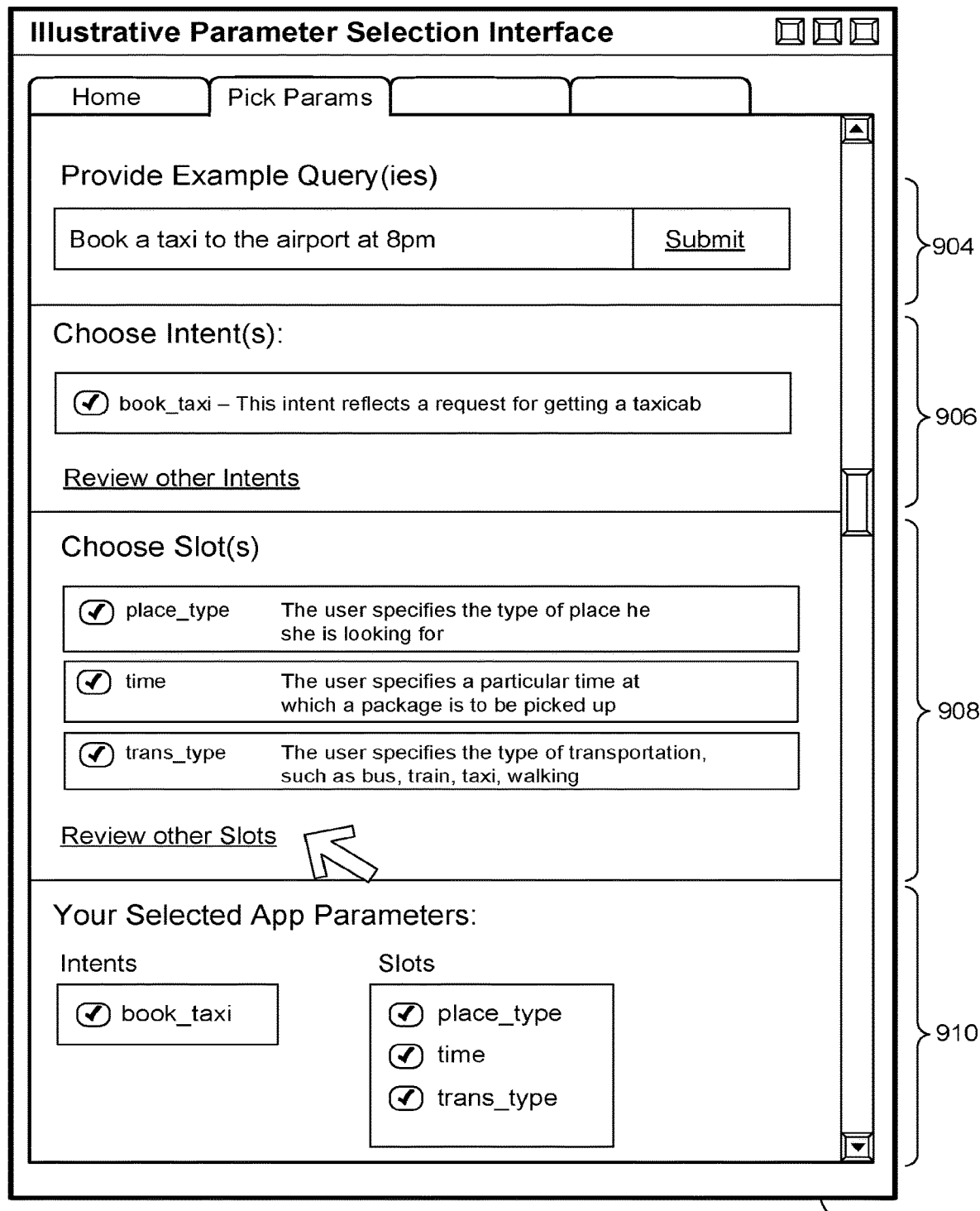
FIG. 9 shows one user interface presentation that may be provided by the parameter selection component of FIG. 8.

FIG. 9 shows one user interface presentation 902 that the parameter selection component 118 may present to the developer for the purpose of soliciting a selection of parameters from the developer. To simplify explanation, FIG. 9 omits the user interface functionality by which the developer describes the state. That functionality, however, is described at a later juncture.

The developer interacts with the user interface presentation 902 via the above-described third mode of operation. In the third mode, the developer specifies one or more example linguistic items associated with the LU scenario under development. The parameter selection component 118 responds by presenting parameters that are implicated by the examples. For example, assume that the developer is creating a new application that will allow an end user to call for a taxicab. In portion 904 of the user interface presentation 902, the developer inputs an example linguistic item that is appropriate to this scenario, such as the item, "Book a taxi to the airport at 8 pm."

In portion 906, the query component 806 provides a single suggested intent parameter, "book_taxi." This intent parameter reflects an end user's intent to request a taxicab. In portion 908, the query component 806 suggests three slot parameters, "place_type," "time," and "trans_type." The first parameter characterizes the place an end user is looking for. The second parameter characterizes a time at which a package is to be picked up. The third parameter specifies a type of transportation. The parameter picking component 810 allows the developer to select any number of the suggested parameters by placing check marks next to the parameters. A bottommost portion 910 provides a master list of the parameters that the developer has chosen so far.

Consider the "time" parameter in further detail. Assume that the generic LU model has not been specifically trained to handle an LU scenario associated with the booking of taxicabs. Therefore, the generic LU model does not specifically support a parameter that identifies the time at which a taxicab is scheduled to pick up a passenger. But the generic LU model may nevertheless support other scenarios that can be repurposed for use in the new LU scenario under development. For example, assume that the generic LU model supports a scenario in which the end user may request a delivery person to pick up a package at a particular time and deliver it to a desired destination. In connection therewith, the query component 806 identifies a "time" parameter from this scenario, corresponding to the time at which a package is to be picked up. The developer in the case of FIG. 9 has selected the "time" parameter in hopes that it can be repurposed and reused in the new LU scenario under development which pertains to the scheduling of a taxicab.

Figure 10:
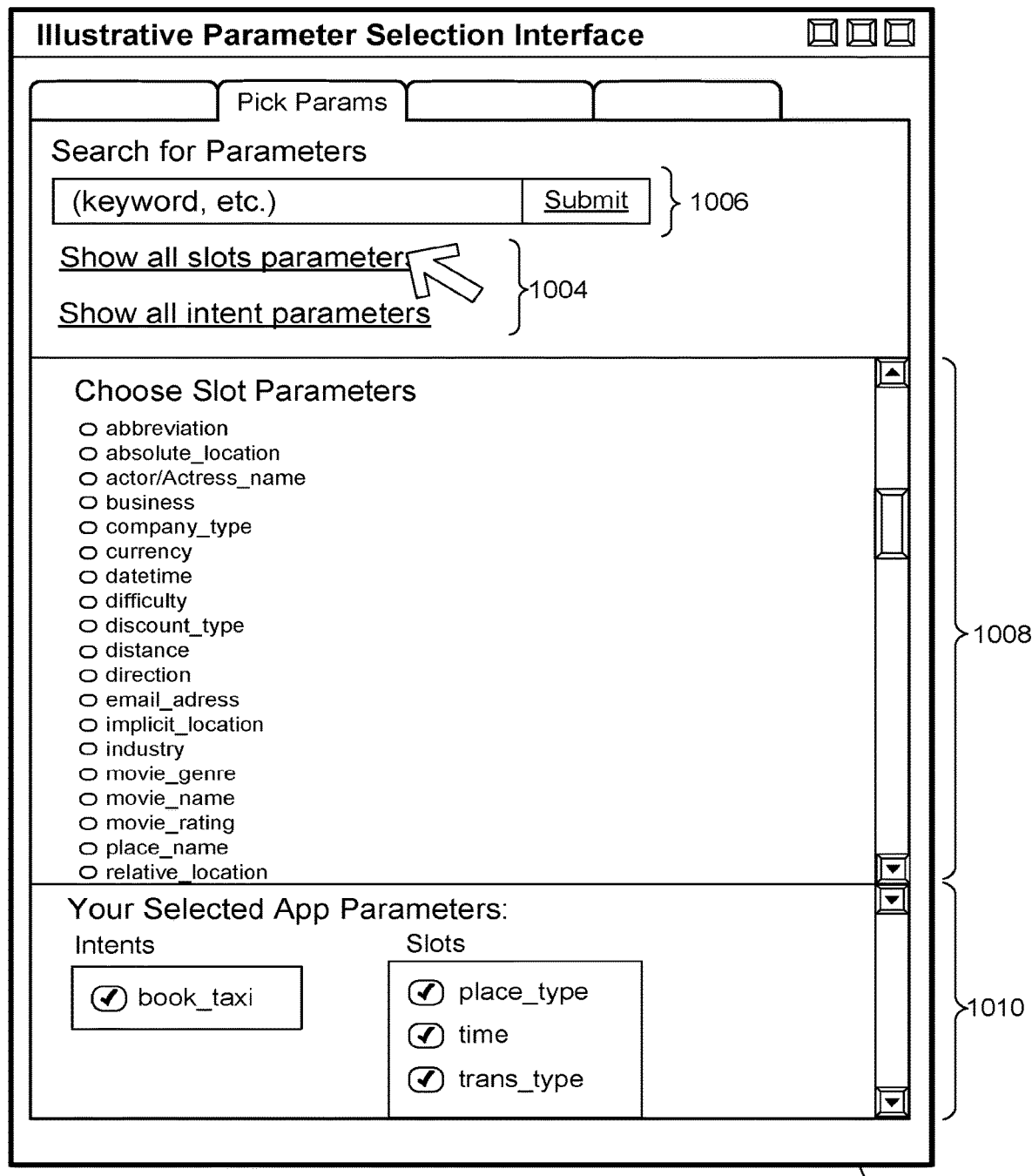
FIG. 10 shows another user interface presentation that may be provided by the parameter selection component of FIG. 8.

FIG. 10 shows a user interface presentation 1002 that the parameter selection component 118 may present to the developer with respect to the above-described first and second modes of operation. In the first mode, the developer asks the query component 806 to show all of the parameters in the master set of parameters 116, e.g., corresponding to a list of all the intent parameters or a list of all the slot parameters. The developer may make such an instruction via the portion 1004 of the user interface presentation 1002. In the second mode, the developer may specify a keyword pertaining to the parameter(s) being sought. The query component 806 responds by displaying a list of parameters (if any) that satisfy the input keyword. The developer may enter such a keyword via the portion 1006 of the user interface presentation 1002.

Assume that the developer has instructed the query component 806 to present a list of all of the slot parameters. In response, a portion 1008 presents such a list. The developer may receive a definition of any parameter in the list by hovering over it with a mouse device or selecting it in some other manner. The developer may choose any parameters in that list for inclusion in the parameter-schema by placing check marks next to those parameters. A bottommost portion 1010 provides a list of the parameters that the developer has chosen.

FIGS. 9 and 10 are predicated on a single-state LU scenario in which the end user presents a single request, and in which the constrained LU component 108 returns a single response. As described above, in other LU scenarios, the interaction between the end user takes the form of a multi-turn dialog having a plurality of states. A developer can specify a subset of parameters for each state of the dialog. In the runtime phase of operation, when operating in a particular state, the constrained LU component 108 will use an appropriate state-specific subset of parameters to constrain the generic LU model.

Figure 11:
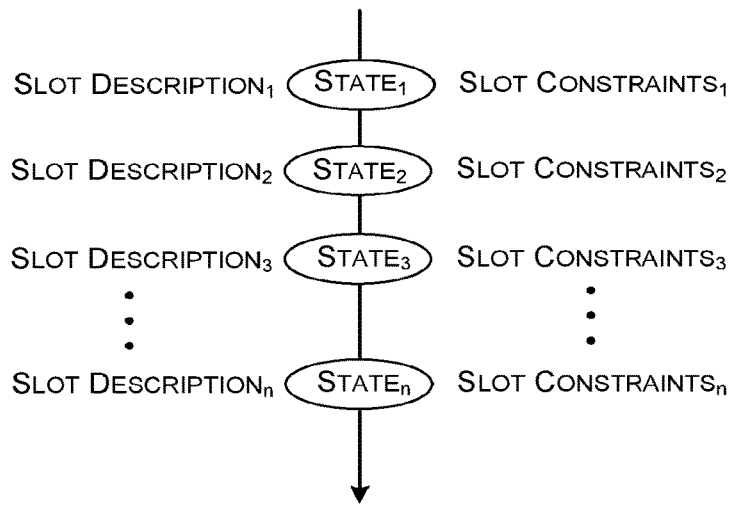
FIG. 11 is a diagram that shows states in a multi-turn dialog; the diagram also indicates that the parameter selection component can select different sets of constraints for the respective states.

FIG. 11 provides a high-level depiction of an LU scenario for a multi-turn dialog. Each state in the multi-turn dialog is characterized and referenced by a particular description. Further, each state in the multi-turn dialog is characterized by a set of slot constraints selected by the developer that are appropriate to that state.

Figure 12:
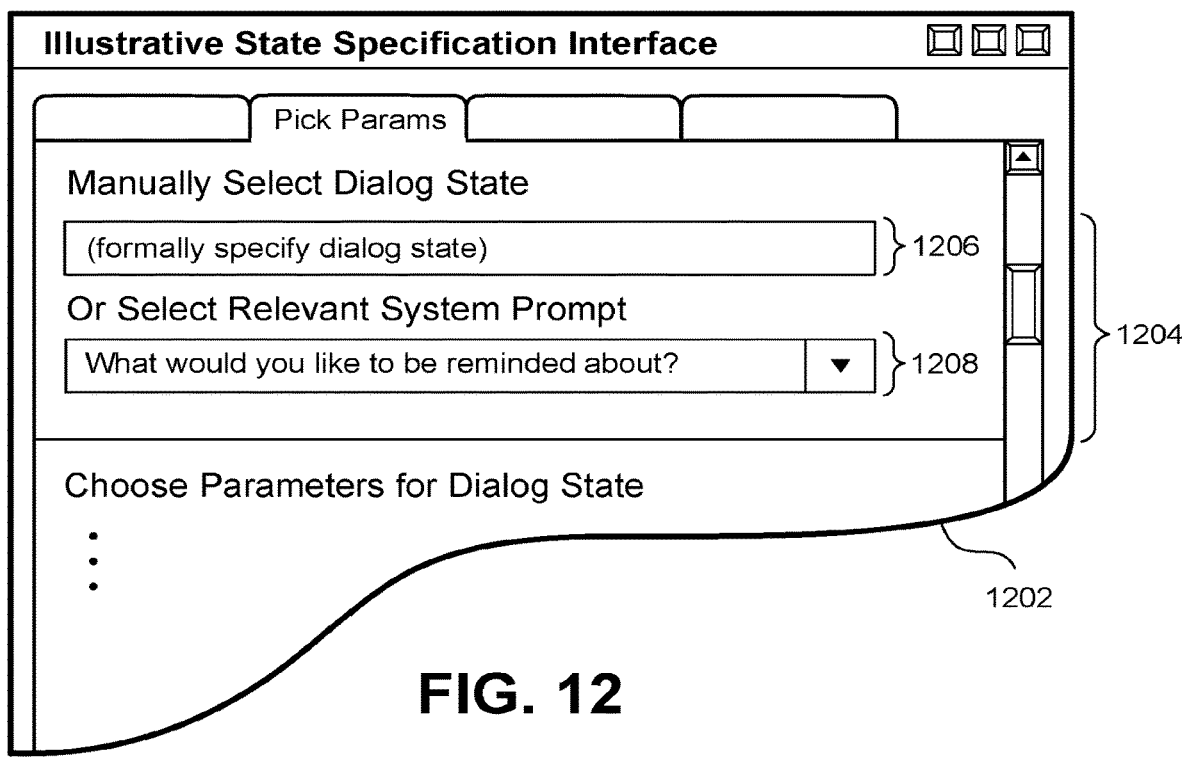
FIG. 12 shows a portion of a user interface presentation by which a developer can specify a state (or characteristic(s) of the state) in a multi-turn dialog.

FIG. 12 shows a part of a user interface presentation 1202 that includes a portion 1204 through which a developer may specify a state, or at least describe one or more characteristics of the state, to provide state information. After specifying or describing the state, the developer may then define the subset of parameters that are appropriate to that state, e.g., using any mode described above with respect to FIGS. 8-10.

The portion 1204 allows the developer to specify or describe the state of a multi-turn dialog using at least two techniques. In a first technique, a portion 1206 allows the developer to formally describe at least some aspects of the state by indicating what has transpired so far in the multi-turn dialog, together with what operations have yet to be completed. For example, assume that a multi-turn dialog is performed to provide directions from a starting location to a destination location, in response to an end user's request for such directions. The developer may describe a particular state in this dialog by describing: (1) the overall intent of the dialog; (2) the information that has been collected so far in the dialog; (3) the particular information that the application is waiting on at this particular juncture (if any), and so on.

In a second technique, a portion 1208 allows the developer to describe the state by specifying an application prompt that is appropriate for that state. In the example of FIG. 12, for instance, the developer interacts with a drop-down menu to choose the application response, "What would you like to be reminded about?" By choosing this prompt message, the developer is describing a juncture in a multi-turn dialog in which the application 110 is waiting for the end user to specify the subject matter of a reminder message. Note that the application 110 need not actually present the prompt shown in FIG. 12 in every interaction with an end user at runtime; nor need the prompt that is presented at runtime exactly match the prompt shown in FIG. 12. The prompt shown in FIG. 12 only serves as a shorthand reference to a particular juncture in the multi-turn dialog.

The two techniques described above are presented by way of illustration, not limitation; other implementations can use yet other techniques to solicit the developer's description of a dialog state.

Figure 13:
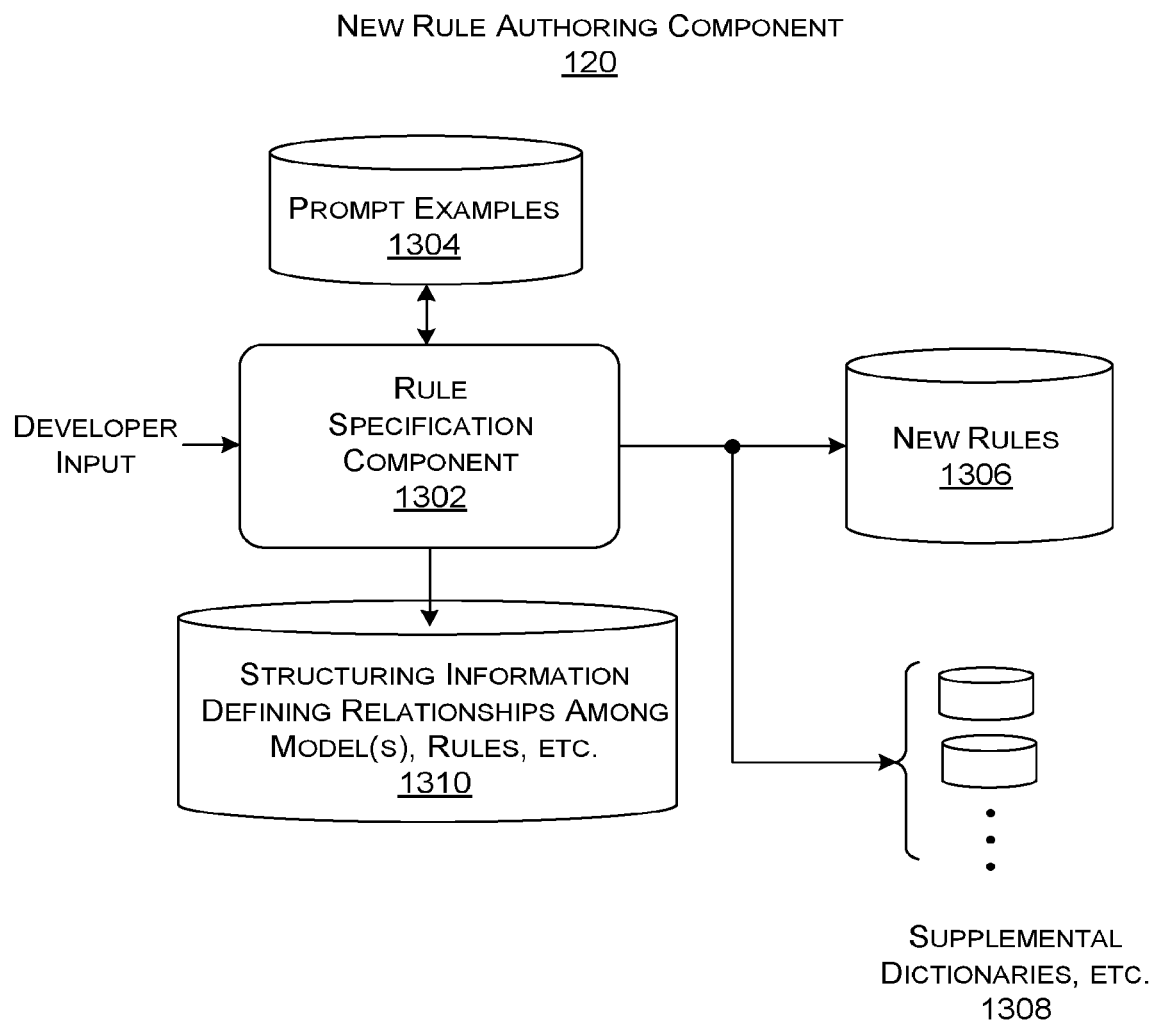
FIG. 13 shows one implementation of a new rule authoring component, which is another component of the development environment of FIG. 1.

FIG. 13 shows one implementation of the new rule authoring component 120, which is additional functionality introduced in the context of FIG. 1. As described above, the developer may choose to invoke the services of the new rule authoring component 120 when he or she determines that the resources of the generic LU component model cannot be reused to implement all aspects of the new LU scenario under development. That is, the developer interacts with the new rule authoring component 120 to create one or more new rules to overcome any such identified deficiencies in the generic LU model.

A rule specification component 1302 allows the developer to specify the various aspects of a new rule. As one aspect, the developer may describe the state to which the rule applies within a multi-turn dialog (if, indeed, the rule is to be applied in the context a multi-turn dialog, rather than a single-turn dialog), to provide state information. In one case, the rule specification component 1302 may guide the developer in describing the state by offering a list of possible application prompts that are associated with different states. A data store 1304 may store a list of these prompts.

As another aspect, the developer may interact with the rule specification component 1302 to specify the composition of the new rule. For instance, the rule specification component 1302 may allow the developer to specify the logic that the rule uses to interpret an input linguistic item. For instance, for some kinds of rules, the developer may specify the logic as an exact expression (to be matched with the input linguistic item), a regular expression (regex), a context free grammar, a finite state transducer (FST), etc. Alternatively, or in addition, the developer may specify one or more dictionaries or other resources to be used to interpret the end user's input linguistic item. For example, the developer may specify a dictionary of place names to be used in interpreting place-related information conveyed by the input linguistic item.

A data store 1306 stores the new rule(s) created by the developer. One or more other data stores 1308 store any dictionary(ies) (and/or other supplemental resources) referenced by the developer's rule(s).

Another data store 1310 may optionally store structuring information that identifies the manner in which the new rule(s) are to be integrated with other parts of the constrained LU model. For instance, in one implementation, the structuring information may indicate that a new rule is to be exclusively applied to a particular state of a multi-turn dialog; the structuring information may indicate that the generic LU model (as constrained by the subsets of selected parameters) is to be applied for all other states of the multi-turn dialog. In another case, the structuring information may indicate that a new rule is to be applied in a particular state of the dialog when a particular kind of linguistic item has been submitted; the structuring information may indicate that the generic LU model (as constrained by the subset of selected parameters) is to be applied when another kind of linguistic item has been submitted. In some cases, a developer may explicitly specify the structuring information. In other cases, the new rule authoring component 120 can automatically add the structuring information based on default assumptions.

In some implementations, the constrained LU component 108 applies the rule(s) defined by the developer as a persistent part of the constrained LU component 108. In other cases, the constrained LU component 108 applies the rule(s) only for an initial period of time. During that time, the development tool 106 records the linguistic items submitted to the application 110 by end users, and the interpretations provided by the application 110 in response thereto. The development tool 106 may then use these linguistic items as training examples for the purpose of updating the generic LU model, through a machine-training operation. Thereafter, the developer may use the updated generic LU model instead of the new rule(s). As such, the parameters associated with the new rule(s) are thereafter handled by the updated generic LU model. In this context, the new rule(s) serve in a bootstrapping role.

Figure 14:
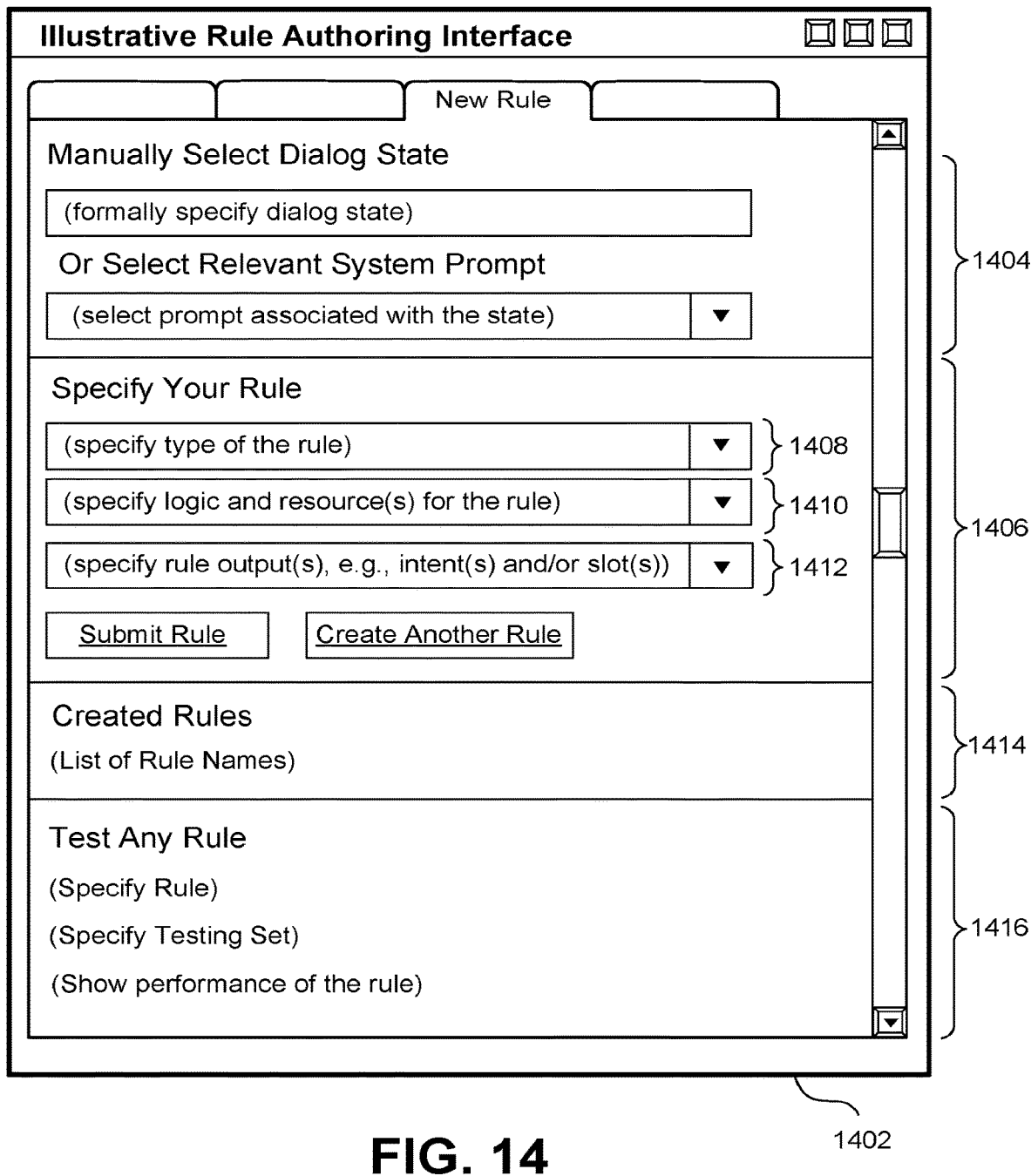
FIG. 14 shows one user interface presentation that may be provided by the new rule authoring component of FIG. 13.

FIG. 14 shows one user interface presentation 1402 that may be provided by the new rule authoring component 120 of FIG. 13. In portion 1404, the developer describes the state to which the new rule applies, to provide state information. The developer may describe the state in any manner described above with respect to FIG. 12, e.g., in a formal manner or with reference to an appropriate application prompt.

A portion 1406 allows the developer to specify the different features of the rule being created. For instance, in portion 1408, the developer may specify the type of logic that is applied by the rule, e.g., by indicating whether the rule applies to an exact expression for use in matching, a regular expression (regex), a context free grammar, finite state transducer (FST) logic, etc. In portion 1410, the developer supplies the logic associated with the rule, e.g., by creating the logic via the user interface presentation 1402 or by specifying a path from which the logic, created elsewhere, can be accessed. In portion 1412, the developer specifies the parameters that are output by the rule when it is invoked, e.g., by specify an intent parameter that is output by the rule when it is invoked. A portion 1414 provides a list of rules that have been created by the new rule authoring component 120.

A portion 1416 provides an interface by which the developer may interact with the testing component 128 (of FIG. 1). For instance, through this portion 1416, the developer may specify a rule to be tested, a test corpus to be used in the testing, etc. The portion 1416 may also display the output results provided by the testing component 128.

Figure 15:
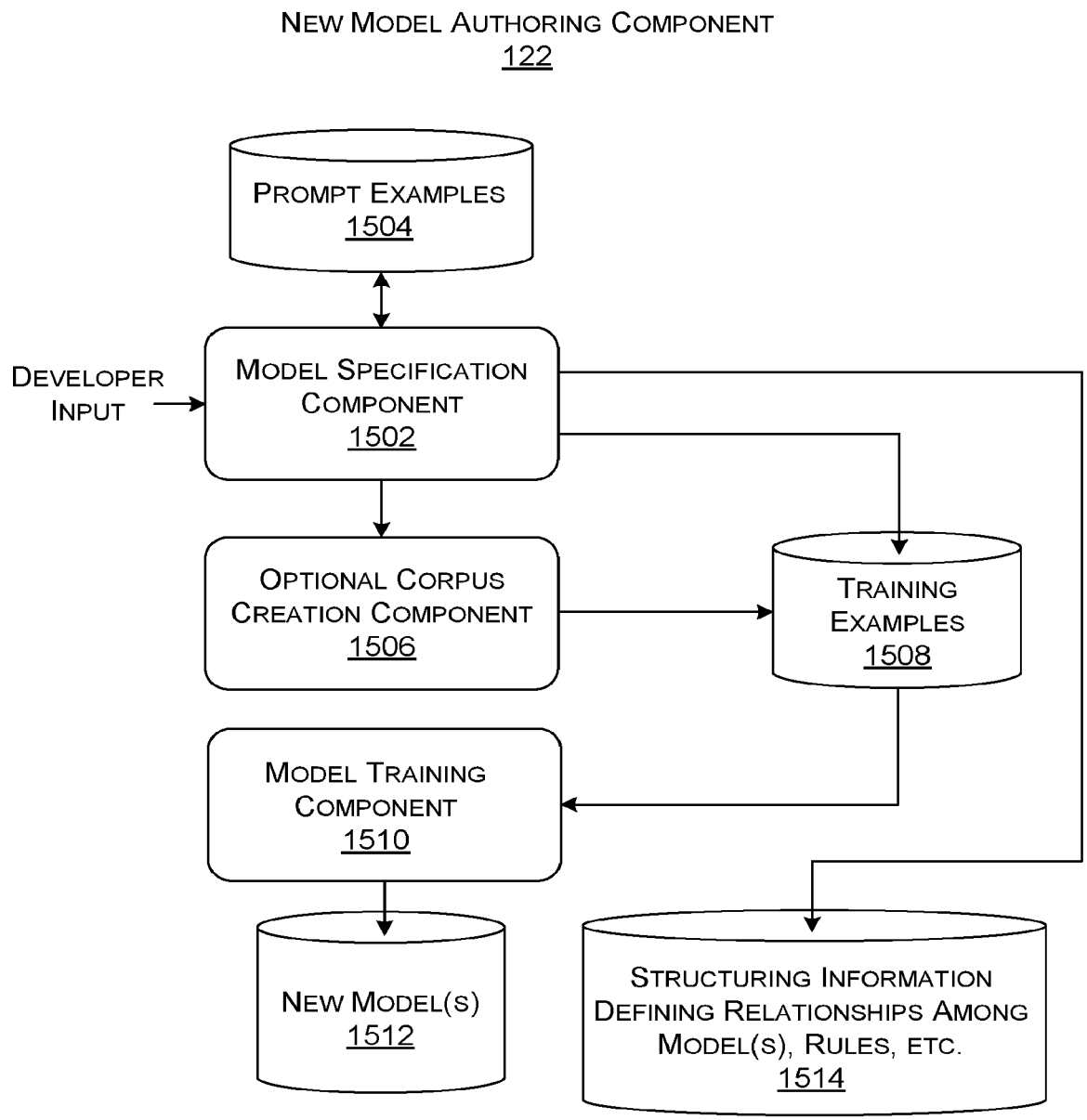
FIG. 15 shows one implementation of a supplemental model creation component, which is another component of the development environment of FIG. 1.

FIG. 15 shows one implementation of the supplemental model creation component 122, which is another component introduced in the context of FIG. 1. As described above, the developer may choose to invoke the services of the supplemental model creation component 122 when he or she determines that the resources of the generic LU model do not meet all aspects of the new LU scenario. In other words, the developer interacts with the supplemental model creation component 122 to create one or more supplemental statistical models to overcome any such identified deficiencies to generic LU model.

A model specification component 1502 allows the developer to specify certain features of the supplemental model. For instance, the developer may use the model specification component 1502 to describe the state to which the new supplemental model applies within a multi-turn dialog. The developer can perform this task using any of the techniques set forth above, such as the techniques discussed in conjunction with FIG. 12. In connection therewith, a data store 1504 stores a collection of application prompts that the developer may use in describing a dialog state.

As another aspect, the developer may interact with the model specification component 1502 to manually specify a corpus of training examples to be used to create the supplemental model, e.g., by specifying a path to the training examples, which are stored in a particular file. Or the developer may specify one or more illustrative training examples pertaining to the LU scenario under consideration, for the particular state under consideration. A corpus creation component 1506 may extract a collection of other training examples that are similar to the training example(s) specified by the developer. For example, the corpus creation component 1506 may mine the historical data logs provided a digital personal assistant to find training examples that are similar to the training example(s) specified by the developer. A data store 1508 specifies the corpus of training examples, in whatever manner they have been specified.

A model training component 1510 can use any machine-learning technique to produce the supplemental model, based on the training examples in the data store 1508. For instance, the model training component 1510 can use a deep neural network technique to produce an intent classification model. Alternatively, or in addition, the model training component can use a Conditional Random Field technique to produce a word-tagging model. The model training component 1510 stores the model(s) that it produces in a data store 1512, where the model(s) may be made up of a collection of model values. A data store 1514 specifies the manner in which the new model(s) are to be integrated with other aspects of the constrained LU component 108 (e.g., in the same manner described above with respect to FIG. 13). (Generally note that the data store 124 shown in FIG. 1, which provides the customization logic 126, may correspond to a shorthand reference to any or all of the data stores 812, 1306, 1310, 1512, and 1514 shown in FIGS. 8, 13, and 15.)

In another implementation, the a training system (not shown) can add the training examples in the data store 1508 to a more encompassing training corpus that was used to produce the generic LU model, to provide an updated master training corpus. The training system can then retrain the generic LU model on the basis of the updated master training corpus. In this implementation, there is no need to create a standalone supplemental model.

Figure 16:
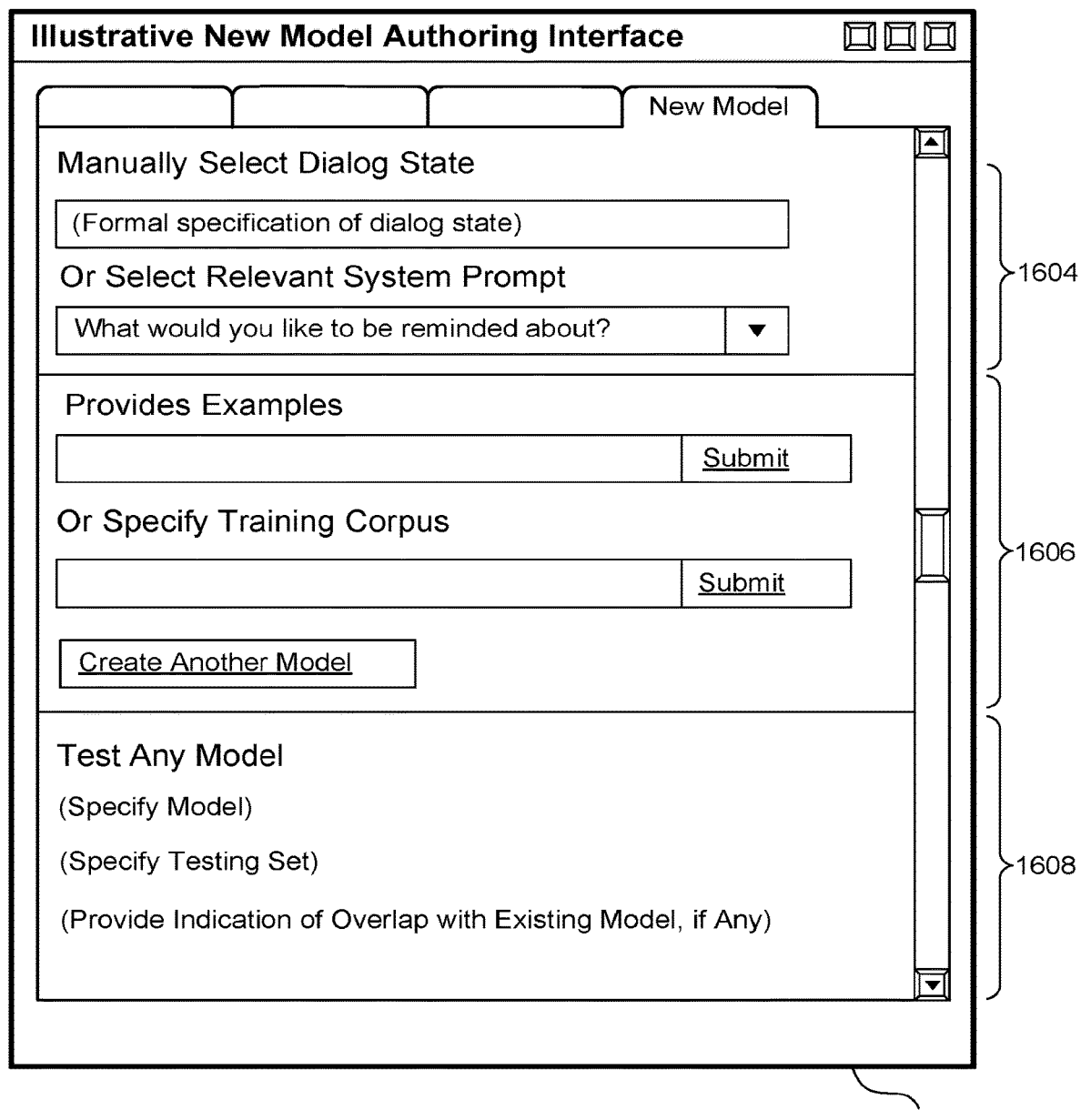
FIG. 16 shows one user interface presentation that may be provided by the supplemental model creation component of FIG. 15.

FIG. 16 shows one user interface presentation 1602 that may be provided by the supplemental model creation component 122 of FIG. 15. A portion 1604 allows the developer to describe the dialog state to which the supplemental model(s) apply. A portion 1606 allows the developer to specify the training corpus to be used in producing the new model(s). And a portion 1608 allows the developer to test the performance of the new model(s).

B. Illustrative Processes

Figure 17:
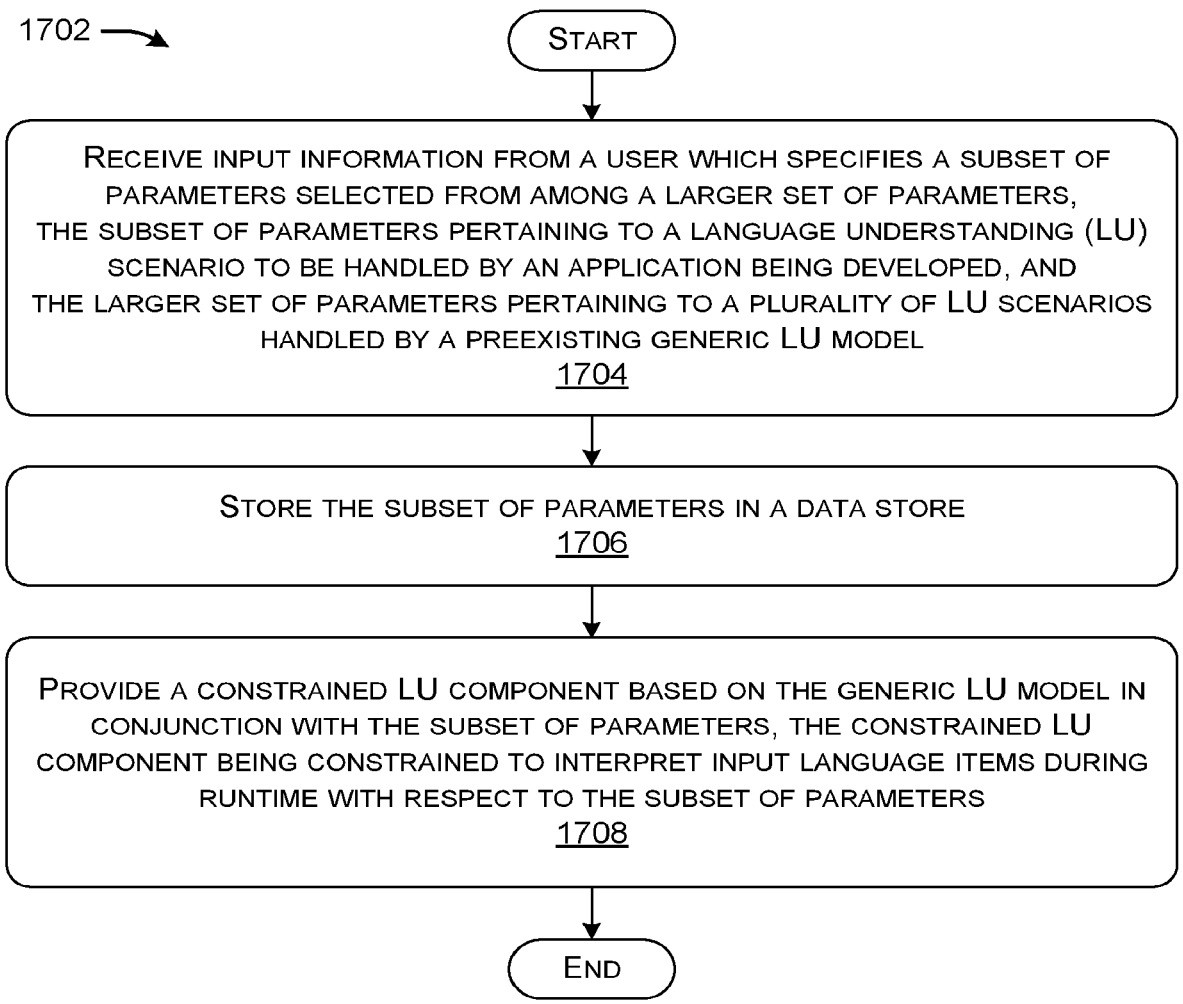
FIG. 17 shows a process that represents one manner of operation of the development environment of FIG. 1.
Figure 18:
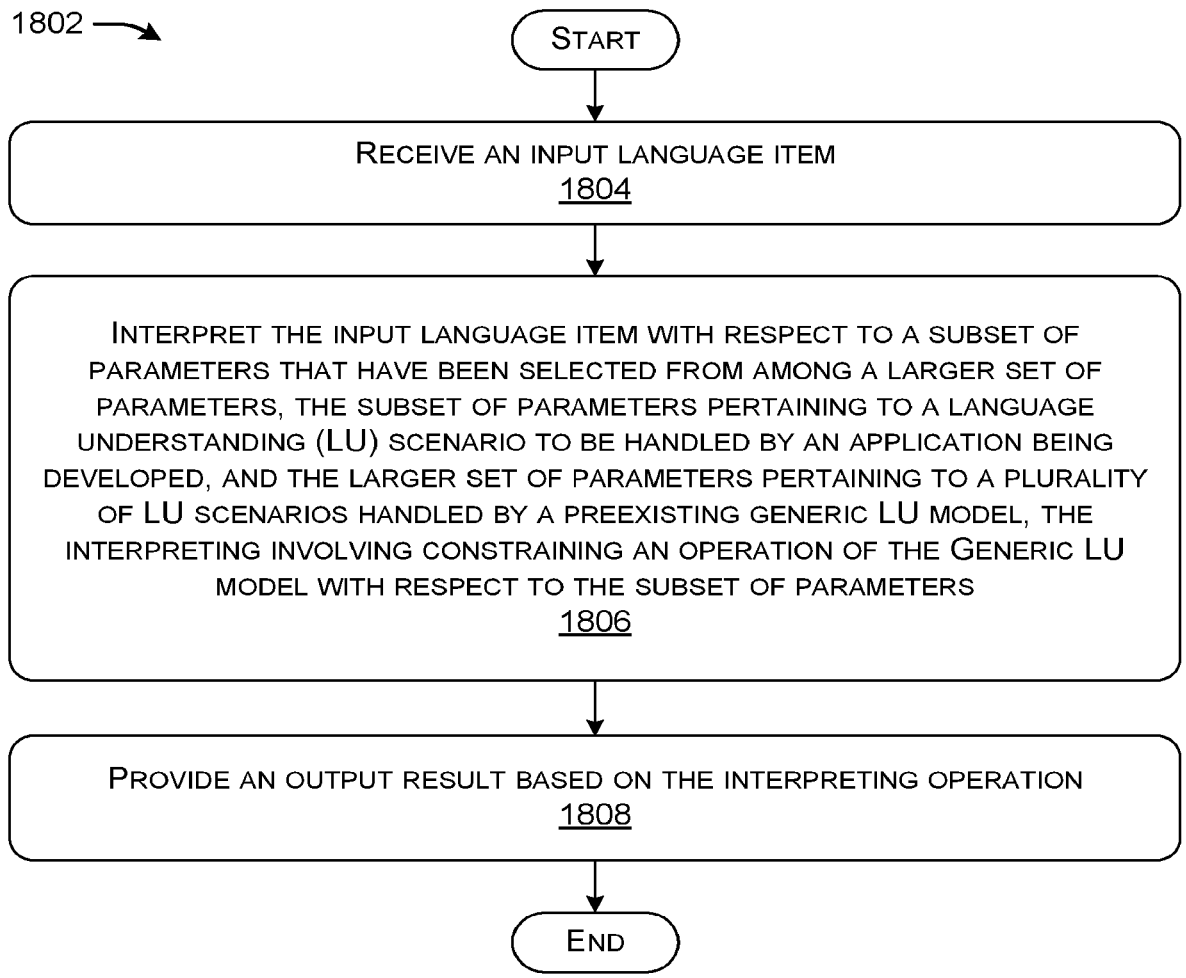
FIG. 18 shows a process that represents one manner of operation of the runtime environment of FIG. 1.

FIGS. 17 and 18 show processes that explain the operation of the development environment 102 and the runtime environment 104 of Section A in flowchart form. Since the principles underlying the operation of the environments (102, 104) have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

Starting with FIG. 17, this figure shows a process 1702 that represents one manner of operation of the development environment 102 of FIG. 1. In block 1704, the development environment 102 receives input information from a developer, via a user interface presentation that is presented on a display device. The input information specifies a subset of parameters selected from among the larger set of parameters 116. The subset of parameters pertains to a language understanding (LU) scenario to be handled by the application 110 being developed, defining the parameter-schema of that application. The larger set of parameters 116 pertains to a plurality of LU scenarios handled by a preexisting generic LU model. In block 1706, the development environment 102 stores the subset of parameters in a data store (124, 812).

In block 1708, the development environment 102 provides a constrained LU component based on the generic LU model in conjunction with the subset of parameters. The constrained LU component is constrained at runtime to interpret input language items with respect to the subset of parameters.

FIG. 18 shows a process 1802 that represents one manner of operation of the runtime environment 104 of FIG. 1. In block 1804, the constrained LU component 108 receives an input language item from an end user. In block 1806, the constrained LU component interprets the input language item with respect to the subset of parameters that have been selected from among the larger set of parameters 116. To repeat, the subset of parameters pertains to a LU scenario to be handled by the application 110 being developed, while the larger set of parameters 116 pertains to a plurality of LU scenarios handled by the preexisting generic LU model. The interpreting operation involves constraining the operation of the generic LU model with respect to the subset of parameters. In block 1808, the constrained LU component 108 provides an output result based on the above-referenced interpreting operation.

C. Representative Computing Functionality

Figure 19:
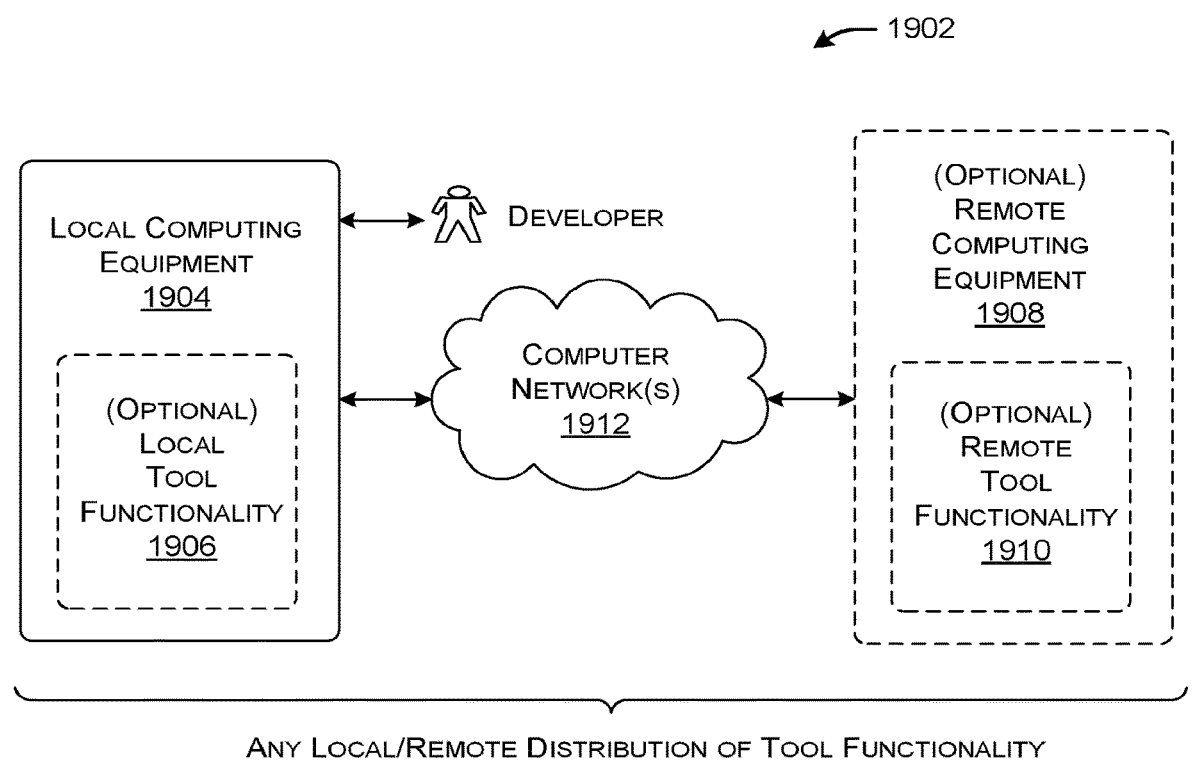
FIG. 19 shows representative computing equipment that can be used to implement the development environment and/or the runtime environment of FIG. 1.

FIG. 19 shows computing equipment 1902 that can be used to implement the development tool 106 of FIG. 1. In a first implementation, local computing equipment 1904 is used to implement the entirety of the development tool 106. The local computing equipment 1904 may correspond, for instance, to any of: a stationary desktop computing device, a set-top box, a game console device, a tablet-type computing device, a smartphone, a media consumption device, a wearable computing device, and so on, or any combination thereof. The local computing equipment 1902 may implement the development tool 106 using local tool functionality 1906, e.g., which may correspond to locally-stored code which implements the functions described above.

In a second implementation, remote computing equipment 1908 is used to implement the entirety of the development tool 106. The remote computing equipment 1908 may correspond to one or more server computing devices or the like, provided at a single location or distributed across multiple locations. The remote computing equipment 1908 may implement the development tool 106 using remote tool functionality 1910, e.g., which may correspond to code which implements at least some of the functions described above.

One or more computer networks 1912 couple the local computing equipment 1904 to the remote computing equipment 1908. The computer network(s) 1912 may correspond to a wide area network (e.g., the Internet), a local area network, etc., or combination thereof. The local computing equipment 1904 may use a browser program or the like to interact with the remote tool functionality 1910.

In a third implementation, the local computing equipment 1904 implements some parts of the development tool 106, while the remote computing equipment 1908 implements other parts of the development tool 106. For example, the third implementation can allocate certain computationally-intensive functions of the development tool 106 to the remote computing equipment 1908, and the remainder of the functions to the local computing equipment 1904.

Although not shown in FIG. 19, the constrained LU component 108 itself can be implemented by the type of computing equipment 1902 shown in FIG. 19, corresponding to any implementation described above. That is, the constrained LU component 108 can be implemented by the local computing equipment 1904 alone, by the remote computing equipment 1908 alone, or by a combination of the local computing equipment 1904 and the remote computing equipment 1908.

Figure 20:
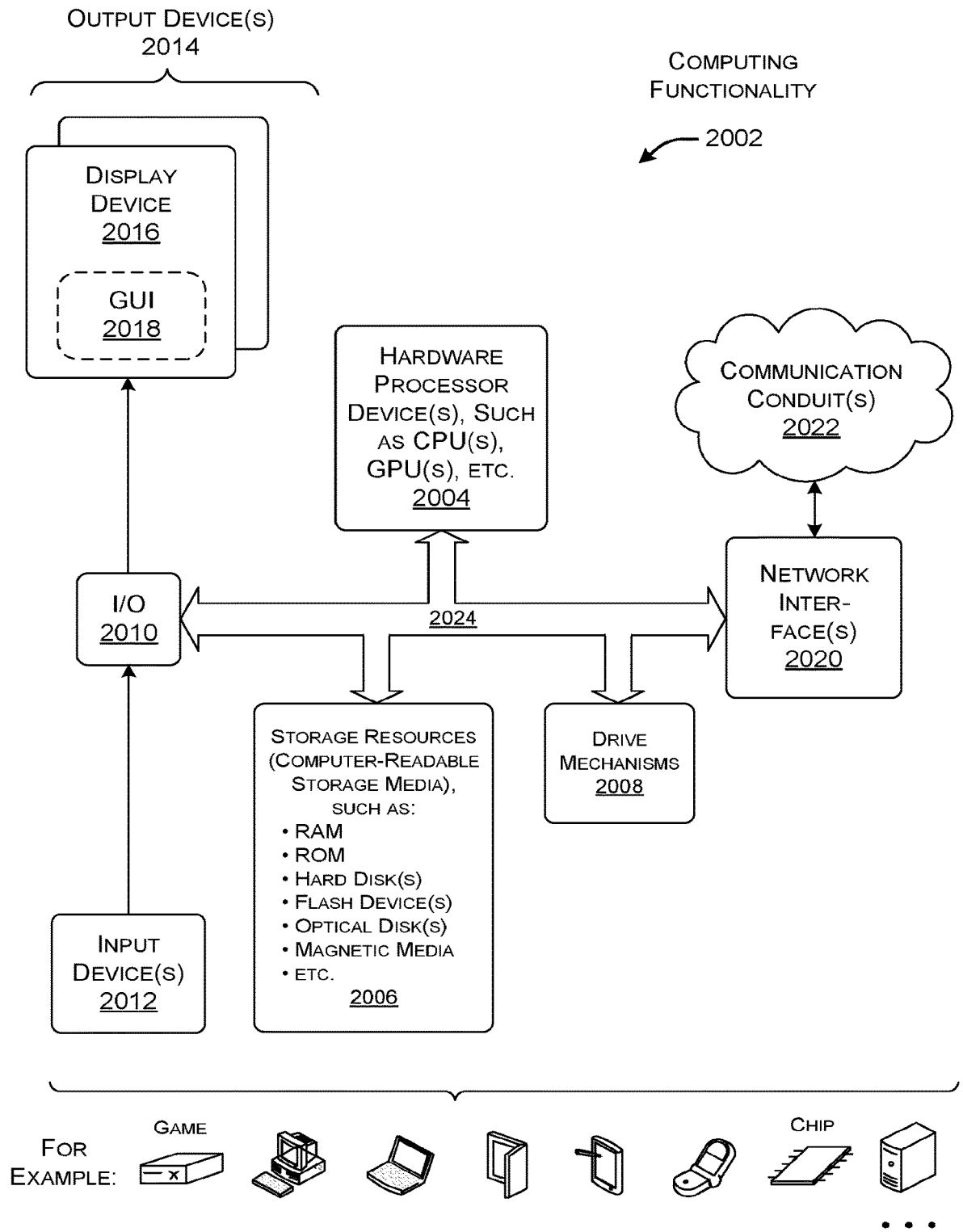
FIG. 20 shows additional computing equipment that can be used to implement any aspect of the features shown in the foregoing drawings.

FIG. 20 shows computing functionality 2002 that can be used to implement any aspect of the mechanisms set forth in the above-described figures. For instance, the type of computing functionality 2002 shown in FIG. 20 can be used to implement any of the local computing equipment 1904 and/or the remote computing equipment 1908 of FIG. 19. In all cases, the computing functionality 2002 represents one or more physical and tangible processing mechanisms.

The computing functionality 2002 can include one or more hardware processor devices 2004, such as one or more central processing units (CPUs), and/or one or more graphical processing units (GPUs), and so on. The computing functionality 2002 can also include any storage resources (also referred to as computer-readable storage media or computer-readable storage medium devices) 2006 for storing any kind of information, such as machine-readable instructions, settings, data, etc. Without limitation, for instance, the storage resources 2006 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 2002. The computing functionality 2002 may perform any of the functions described above when the hardware processor device(s) 2004 carry out computer-readable instructions stored in any storage resource or combination of storage resources. The computing functionality 2002 also includes one or more drive mechanisms 2008 for interacting with any storage resource, such as a hard disk drive mechanism, an optical disk drive mechanism, and so on.

The computing functionality 2002 also includes an input/output component 2010 for receiving various inputs (via input devices 2012), and for providing various outputs (via output devices 2014). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a display device 2016 and an associated graphical user interface presentation (GUI) 2018. The display device 2016 may correspond to a charge-coupled display device, a cathode ray tube device, a projection mechanism, etc. Other output devices include a printer, a model-generating mechanism, a tactile output mechanism, an archival mechanism (for storing output information), and so on. The computing functionality 2002 can also include one or more network interfaces 2020 for exchanging data with other devices via one or more communication conduits 2022. One or more communication buses 2024 communicatively couple the above-described components together.

The communication conduit(s) 2022 can be implemented in any manner, e.g., by a local area computer network, a wide area computer network (e.g., the Internet), point-to-point connections, etc., or any combination thereof. The communication conduit(s) 2022 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 2002 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself The following summary provides a non-exhaustive list of illustrative aspects of the technology set forth herein.

According to a first aspect, a method, implemented by one or more computing devices, is described for creating a language understanding component for use in conjunction with an application. The method includes receiving input information from a developer, via a user interface presentation that is presented on a display device, which specifies a subset of parameters selected from among a larger set of parameters. The subset of parameters pertains to a language understanding (LU) scenario to be handled by the application, the subset of parameters defining a parameter-schema associated with the application. The larger set of parameters pertain to a plurality of LU scenarios handled by a preexisting generic LU model. The method also includes storing the subset of parameters in a data store, and providing a constrained LU component based on the generic LU model in conjunction with the subset of parameters. The constrained LU component is constrained at runtime to interpret input language items, input via an input device, with respect to the subset of parameters that have been selected.

According to a second aspect, the method further includes receiving a selection by the developer of a state in a multi-turn dialog, or at least one characteristic of that state, to provide state information. The above-referenced subset of parameters pertain to the state information that has been selected.

According to a third aspect, the above-referenced receiving of a selection of the state information involves receiving a selection of a prompt that is associated with the specified state.

According to a fourth aspect, the preexisting generic LU model is a statistical model that is trained based on a generic set of training examples to recognize input language items associated with the plurality of LU scenarios, associated with respective different domains of analysis.

According to a fifth aspect, the above-referenced receiving input information includes: receiving at least one example query via the user interface presentation; using the generic LU model to identify zero, one or more candidate parameters associated with the above-referenced at least one example query; presenting the above-referenced zero, one or more candidate parameters to the developer on the user interface presentation; and receiving selection by the developer, via the user interface presentation, of zero, one or more of the candidate parameters.

According to a sixth aspect, the above-referenced receiving input information includes: providing a list of at least some of the larger set of parameters on the user interface presentation; and receiving selection by the developer, via the user interface presentation, of zero, one or more from the list of parameters.

According to a seventh aspect, the constrained LU component is constrained during runtime by filtering output items generated by the generic LU model with respect to the subset of parameters, to thereby provide only output items that conform to the subset of parameters.

According to an eighth aspect, the constrained LU component is constrained during runtime by restricting the generic LU model such that interpretation performed by the generic LU model is restricted by the subset of parameters.

According to a ninth aspect, the interpretation is restricted by deactivating paths in a decoding lattice that are not associated with the subset of parameters.

According to a tenth aspect, the interpretation is restricted by deactivating binary classification models associated with parameters not found in the subset of parameters.

According to an eleventh aspect, the constrained LU component is further constrained during runtime by filtering output items generated by the generic LU model with respect to the subset of parameters.

According to a twelfth aspect, the method further includes: receiving rule input information that specifies a new rule to be used in conjunction with the constrained LU component; and creating the new rule based on the rule input information.

According to a thirteenth aspect, the above-referenced receiving of the new rule input information involves receiving a selection by the developer of a specified state in a multi-turn dialog, or at least one characteristic of that state, to provide state information.

According to a fourteenth aspect, one or more computing devices are described that implement a development tool for creating a language understanding component. The computing device(s) include a parameter selection component that is configured to receive input information from a developer, via a user interface presentation that is presented on a display device, which specifies a subset of parameters selected from among a larger set of parameters. The subset of parameters pertain to a language understanding (LU) scenario to be handled by an application, while the larger set of parameters pertain to a plurality of LU scenarios handled by a preexisting generic LU model. The parameter selection component is further configured to store the subset of parameters in a data store, and provide a constrained LU component based on the generic LU model in conjunction with the subset of parameters. The constrained LU component is constrained at runtime to interpret input language items with respect to the subset of parameters.

According to a fifteenth aspect, the parameter selection component is configured to receive a selection by the developer of a state in a multi-turn dialog, or at least one characteristic of that state, to provide state information. The subset of parameters pertain to the state information that has been selected.

According to a sixteenth aspect, the development tool further includes a rule authoring component that is configured to: receive rule input information that specifies a new rule to be used in conjunction with the constrained LU component; and create the new rule based on the rule input information.

According to a seventeenth aspect, a computer-readable storage medium for storing computer-readable instructions is described. The computer-readable instructions, when executed by one or more processor devices, perform a method that includes receiving an input language item from a user. The method then entails interpreting the input language item with respect to a subset of parameters that have been selected from among a larger set of parameters. The subset of parameters pertain to a language understanding (LU) scenario to be handled by an application, while the larger set of parameters pertain to a plurality of LU scenarios handled by a preexisting generic LU model. The above-referenced interpreting involves constraining an operation of the generic LU model with respect to the subset of parameters. The method further includes providing an output result based on the above-referenced interpreting.

According to an eighteenth aspect, the above-referenced constraining includes filtering output items generated by the generic LU model with respect to the subset of parameters, to thereby provide only output items that conform to the subset of parameters.

According to a nineteenth aspect, the above-referenced constraining includes restricting the generic LU model such that interpretation performed by the generic LU model is restricted by the subset of parameters.

According to a twentieth aspect, the above-referenced restricting includes deactivating paths in a decoding lattice that are not associated with the subset of parameters.

A twenty-first aspect corresponds to any combination (e.g., any permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
   one or more hardware processor devices; and
   one or more computer-readable storage media storing
      machine-readable instructions which, when executed by the one or more hardware processor devices, cause the one or more hardware processor devices to:

access a language understanding model having a plurality of classifiers configured to output parameters reflecting results of classification operations performed by the classifiers for a plurality of language understanding scenarios;

receive input information specifying a subset of specific parameters selected from among the parameters output by the language understanding model, the subset of specific parameters pertaining to a particular language understanding scenario to be handled by a particular application;

store customization logic identifying the subset of specific parameters in a data store; and provide a constrained language understanding component based at least on the language understanding model, the constrained language understanding component being configured to perform interpretation of input language items based at least on the subset of specific parameters identified by the customization logic, wherein the constrained language understanding component reuses a subset of classifiers of the language understanding model corresponding to the subset of specific parameters identified by the customization logic.

2. The system of claim 1, wherein the machine-readable instructions, when executed by the one or more hardware processor devices, cause the one or more hardware processor devices to:

select the subset of classifiers based at least on the subset of specific parameters identified by the customization logic.

3. The system of claim 2, wherein the subset of classifiers output the subset of specific parameters identified by the customization logic.

4. The system of claim 1, wherein the machine-readable instructions, when executed by the one or more hardware processor devices, cause the one or more hardware processor devices to:

execute a development tool that is configured to apply the customization logic to the language understanding model and output the constrained language understanding component.

5. The system of claim 1, wherein the language understanding model is trained based at least on a generic set of training examples to recognize various input language items associated with the plurality of language understanding scenarios, including at least one language understanding scenario other than the particular language understanding scenario to be handled by the particular application.

6. The system of claim 5, wherein the plurality of classifiers of the language understanding model comprise a plurality of binary classifiers, and the subset of classifiers comprises individual binary classifiers selected from the plurality of binary classifiers of the language understanding model.

7. A method implemented by one or more computing devices, the method comprising:

accessing a language understanding model having a plurality of classifiers configured to output parameters reflecting results of classification operations performed by the classifiers, the plurality of classifiers pertaining to a plurality of language understanding scenarios;

receiving input information specifying a subset of specific parameters selected from among the parameters output by the language understanding model, the subset of specific parameters pertaining to a particular language understanding scenario;

storing customization logic identifying the subset of specific parameters in a data store; and providing a constrained language understanding component based at least on the customization logic and the language understanding model, the constrained language understanding component being configured to perform interpretation of input language items for the particular language understanding scenario, wherein providing the constrained language understanding component comprises selectively reusing a subset of classifiers of the language understanding model in the constrained language understanding component, the subset of classifiers corresponding to the subset of specific parameters identified by the customization logic.

8. The method of claim 7, wherein the selectively reusing comprises:

deactivating one or more other classifiers of the language understanding model.

9. The method of claim 7, wherein the parameters output by the language understanding model comprise a plurality of intents pertaining to the plurality of language understanding scenarios, and the subset of specific parameters comprises a subset of intents pertaining to the particular language understanding scenario.

10. The method of claim 9, wherein the language understanding model comprises a neural network model.

11. The method of claim 7, wherein the parameters output by the language understanding model comprise a plurality of tags pertaining to the plurality of language understanding scenarios, and the subset of specific parameters comprises a subset of tags pertaining to the particular language understanding scenario.

12. The method of claim 11, wherein the language understanding model comprises a Conditional Random Field model.

13. A computer-readable storage medium storing computer-readable instructions which, when executed by one or more processor devices, cause the one or more processor devices to perform acts comprising:

accessing a language understanding model having a plurality of classifiers configured to output parameters reflecting results of classification operations performed by the classifiers;

receiving input information specifying a subset of specific parameters selected from among the parameters output by the language understanding model, the subset of specific parameters pertaining to a language understanding scenario to be handled by an application;

storing customization logic identifying the subset of specific parameters in a data store; and based at least on the customization logic, customizing the language understanding model to obtain a constrained language understanding component that is configured to perform interpretation of input language items, wherein the customizing comprises selectively reusing a subset of classifiers of the language understanding model in the constrained language understanding component, the subset of classifiers corresponding to the subset of specific parameters identified by the customization logic.

14. The computer-readable storage medium of claim 13, the acts further comprising:

presenting a user interface that conveys multiple parameters output by the language understanding model; and receiving the input information via the user interface.

15. The computer-readable storage medium of claim 14, wherein the multiple parameters conveyed by the user interface comprise multiple intents, and the input information specifies at least one of the multiple intents.

16. The computer-readable storage medium of claim 14, wherein the multiple parameters conveyed by the user interface comprise multiple tags, and the input information specifies at least one of the multiple tags.

17. The computer-readable storage medium of claim 14, the acts further comprising:

receiving one or more example linguistic items via the user interface;

identifying a set of candidate parameters that are output by the language understanding model based at least on the one or more example linguistic items; and outputting the set of candidate parameters on the user interface, wherein the input information selects, from set of candidate parameters on the user interface, at least one parameter of the subset of specific parameters.

18. The computer-readable storage medium of claim 13, wherein the selectively reusing further comprises:

deactivating certain classifiers of the language understanding model that output other parameters.

19. The computer-readable storage medium of claim 13, the acts further comprising:

receiving a particular keyword via a user interface;

identifying particular parameters output by the language understanding model that match the particular keyword; and outputting the particular parameters that match the particular keyword on the user interface, wherein the input information selects, from the particular parameters on the user interface, at least one parameter of the subset of specific parameters.

20. The computer-readable storage medium of claim 13, the acts further comprising:

receiving a particular intent via a user interface;

identifying particular slot parameters of the language understanding model that correspond to the particular intent; and outputting the particular slot parameters that correspond to the particular intent on the user interface, wherein the input information selects, from the particular slot parameters on the user interface, at least one parameter of the subset of specific parameters.

* * * * *